US007347694B2

(12) United States Patent
Berger et al.

(10) Patent No.: US 7,347,694 B2
(45) Date of Patent: Mar. 25, 2008

(54) METHOD AND APPARATUS FOR SCREENING ASPECTS OF VISION DEVELOPMENT AND VISUAL PROCESSING RELATED TO COGNITIVE DEVELOPMENT AND LEARNING ON THE INTERNET

(75) Inventors: Ronald M. Berger, Dayton, MD (US); Kevin Luddy, Mount Airy, MD (US)

(73) Assignee: Oculearn, LLC, Columbia, MD (US)

( * ) Notice: Subject to any disclaimer, the term of this patent is extended or adjusted under 35 U.S.C. 154(b) by 514 days.

(21) Appl. No.: 10/345,402

(22) Filed: Jan. 16, 2003

(65) Prior Publication Data

US 2003/0180696 A1    Sep. 25, 2003

Related U.S. Application Data

(60) Provisional application No. 60/348,363, filed on Jan. 16, 2002.

(51) Int. Cl.
*G09B 19/00* (2006.01)
(52) U.S. Cl. .................. 434/258; 434/236; 351/203; 600/558
(58) Field of Classification Search ............. 434/258, 434/236; 351/203; 600/558
See application file for complete search history.

(56) References Cited

U.S. PATENT DOCUMENTS

| 5,051,931 | A | * | 9/1991 | Cheu et al. ................. 600/558 |
| 5,206,671 | A | * | 4/1993 | Eydelman et al. ........... 351/203 |
| 5,363,154 | A | * | 11/1994 | Galanter et al. ............ 351/203 |
| 5,713,740 | A | | 2/1998 | Middlebrook |
| 5,911,581 | A | * | 6/1999 | Reynolds et al. ........... 434/236 |
| 6,027,217 | A | | 2/2000 | McClure et al. |
| 6,033,076 | A | | 3/2000 | Braeuning et al. |
| 6,290,357 | B1 | | 9/2001 | Massengill et al. |
| 6,364,486 | B1 | * | 4/2002 | Ball et al. .................. 351/203 |
| 6,386,404 | B1 | | 5/2002 | Pelicano |
| 6,406,437 | B1 | | 6/2002 | Zur et al. |
| 6,533,417 | B1 | * | 3/2003 | Sain .......................... 351/203 |
| 6,540,355 | B1 | * | 4/2003 | Couture ...................... 351/203 |
| 6,648,820 | B1 | * | 11/2003 | Sarel .......................... 600/300 |

OTHER PUBLICATIONS

Bodner et al., The Purdue Visualization of Rotations Test, 1997, The Chemical Educator, vol. 2, No. 4, Springer-Verlag New York, Inc. pp. 1-17.*
Friedman et al., How are Visuospatial Working Memory, Executive Functioning, and Spatial Abilities Related? A Latent-Variable Analysis, 2001, Journal of Experimental Psychology, vol. 130, No. 4, pp. 621-640.*

* cited by examiner

*Primary Examiner*—Robert E. Pezzuto
*Assistant Examiner*—Cameron Saadat
(74) *Attorney, Agent, or Firm*—Edell, Shapiro & Finnan, LLC

(57) ABSTRACT

A screening evaluation tool of the present invention provides instructions and mechanisms to probe areas of vision (related to learning). These areas include eye movements used during reading, visual imagery of mental pictorial images generated by viewing, visual recall of mental pictorial images maintained over time, mental manipulation of pictorial images transformed spatially and visual manipulation of mental pictorial images viewed from multiple spatial perspectives. The screening may be conducted remotely from any physical location via the Internet or other network. In addition, the present invention may be utilized for performing therapy, screening tests or more formal evaluations over the Internet. The screening tests and evaluations may be of multiple varieties and are made available for the purpose of further exploring or ruling out the need for further exploration of areas of dysfunction that relate to reduced performance in learning.

25 Claims, 32 Drawing Sheets

Patient's Name: John Sample
Patient's Age: 16
Patient's Grade (If Applicable): 13
Date of Screening:
Elapsed Test Time: 9 Minutes The results below are tabularized for each of the tests given. Review the comments after each tabularized test result and the summary recommendation for you at the end of this document. Print these results to present them to a doctor who is certified in the treatment of vision development disorders, if necessary.

| TEST ONE: SACCADIC EYE MOVEMENT | | |
|---|---|---|
| Last 3 Tests (Most Recent First) | Reading Time in Seconds | Test Objects |
| 1 | 9.05 | Letters |
| 2 | 10.81 | Letters |
| 3 | 9.97 | Letters |

For your age group, this is a marginal score. This means that you were unable to accurately guide ocular (eye) movements at the normal speed for your age. Slow or inaccurate eye movements across a page of print or across a chalkboard hinders the acquisition of printed information and can result in any of the following: reduced copying accuracy, reduced copying speed, losing one's place during reading, skipping words or lines, rereading of print, reduced comprehension or delayed vision development. **As a result of this score, it is recommended that a more complete evaluation be performed and possible help sought for speed and accuracy of ocular movement (often called *tracking*).**

FIG.29A

TEST TWO: VISUAL IMAGERY TEST

| Last 8 Tests (Most Recent First) | Number of Digits | Presentation Time in 1/100ths of a Second | Correct? |
|---|---|---|---|
| 1 | 6 | 10 | no |
| 2 | 6 | 10 | yes |
| 3 | 6 | 10 | yes |
| 4 | 6 | 19 | yes |
| 5 | 6 | 16 | no |
| 6 | 6 | 30 | yes |
| 7 | 6 | 60 | yes |
| 8 | 6 | 120 | yes |

Your scores on this test were not fast enough to truly test your visual memory. Try this portion of the screening again.

TEST THREE: VISUAL MEMORY TEST

| Last 3 Tests (Most Recent First) | Difficulty Level (4 being hardest) | Correct? |
|---|---|---|
| 1 | 4 | yes |
| 2 | 4 | yes |
| 3 | 4 | yes |

For your grade level, this is an excellent score! No further follow-up is warranted in this area based on these screening results.

TEST FOUR: IMAGE MANIPULATION TEST - PERSPECTIVE

| Last 6 Tests (Most Recent First) | Difficulty Level (5 being hardest) | Correct? |
|---|---|---|
| 1 | 5 | yes |
| 2 | 5 | yes |
| 3 | 5 | no |
| 4 | 5 | yes |
| 5 | 5 | no |
| 6 | 5 | yes |

For your grade level, this is an excellent score! No further follow-up is warranted in this area based on these screening results.

FIG.29B

| TEST FIVE: IMAGE MANIPULATION TEST - TRANSLATION | | |
|---|---|---|
| Last 3 Tests (Most Recent First) | Difficulty Level (5 being hardest) | Correct? |
| 1 | 5 | yes |
| 2 | 5 | yes |
| 3 | 5 | yes |

For your grade level, this is an excellent score! No further follow-up is warranted in this area based on these screening results.

| OVERALL SCREENING RESULTS | |
|---|---|
| Area | Screening Result |
| OCULAR MOVEMENT | Inadequate |
| VISUAL IMAGERY | Incomplete. Please retry. |
| VISUAL MEMORY | Adequate |
| VISUAL THINKING | Adequate |

Making the decision to pursue a complete evaluation of one's vision development that impacts upon learning capacity is not always easy. If two or more areas are considered inadequate and there are signs and symptoms of learning difficulty that could be related to inadequate vision development, then the recommendation to seek further evaluation and possible therapeutic intervention would be a very strong one. Click here to find a doctor with the training necessary to help you in this area.

If only a single area is considered inadequate, the recommendation for complete evaluation is still valid, for eliminating any gap in one's development is certainly a valuable goal. Each area probed can affect multiple aspects of academic achievement.

If each probed area is considered adequate but there are still symptoms of learning difficulties, it is possible that one has the capacity for learning through vision but has chosen a different learning method. It is possible to score adequately well in each separate area, then, and still have difficulty. Some individuals have developed mental imagery to a high level and have learned to use it in normal vision but not for academic study. These individuals could still benefit from a complete evaluation of their vision systems and a determination of how they learn.

FIG.29C

If each area probed is considered adequate and there are no signs or symptoms of learning difficulty linked to vision, then one can feel much more comfortable eliminating vision related problems as a source of learning difficulty and begin looking for help within other biological systems which are considered important to learning. These areas include auditory processing disorders, language disorders, chemical disorders and emotional disorders. For further information on these areas, consult http://www.

| CLOSE |

FIG.29D

METHOD AND APPARATUS FOR SCREENING ASPECTS OF VISION DEVELOPMENT AND VISUAL PROCESSING RELATED TO COGNITIVE DEVELOPMENT AND LEARNING ON THE INTERNET

CROSS-REFERENCE TO RELATED APPLICATIONS

This application claims priority from U.S. Provisional Patent Application Ser. No. 60/348,363, entitled "Method And Apparatus for Screening Aspects of Vision Development and Visual Processing Related to Cognitive Development and Learning on the Internet" and filed Jan. 16, 2002, the disclosure of which is incorporated herein by reference in its entirety.

BACKGROUND OF THE INVENTION

1. Technical Field

The present invention pertains to a methodology and tool by which individuals can participate in and obtain results of a screening evaluation of aspects of vision development and visual processing. The results of the screening can aid individuals in obtaining help for learning difficulties that are caused or exacerbated by inadequate vision development. In particular, the present invention pertains to a screening evaluation tool that enables a screening evaluation to be conducted from any physical location via the Internet or other network. The present invention provides instructions and mechanisms to probe areas of vision (related to learning) including:

a. Eye movements used during reading;
  b. Visual imagery of mental pictorial images generated by viewing;
  c. Visual recall of mental pictorial images maintained over time;
  d. Mental manipulation of pictorial images transformed spatially; and
  e. Visual manipulation of mental pictorial images viewed from multiple spatial perspectives.

2. Discussion of Related Art

Generally, parents discover that their children are having difficulty performing adequately in school months or years after the source of the problem exists. There is no notification until a given child is far enough behind peers to warrant attention, and by that time the child is quickly falling farther behind. Once notified, parents begin an often painful process of determining the source of the problem (e.g., if the problem can be identified) and a corresponding solution (e.g., if a solution exists), or identifying a compensatory method or coping strategy (e.g., if the problem cannot be ameliorated). This process often takes a long time, can be very expensive, and may be incomplete in terms of examining current and possible future learning methods for the child.

The choices available to parents of children with learning difficulties are varied. These include, but are not limited to, school educational or psychoeducational testing, private educational or psychoeducational testing, medical evaluations, speech and language evaluations, psychological evaluations and neurological evaluations. Many of the evaluation methods can result in a diagnosis of learning disability with or without an evaluation of the cause of difficulty.

There are glaring deficiencies in the methodologies of testing for learning difficulties. These deficiencies include the substantial time required for conducting testing, omission of areas tested that may reveal root causes or exacerbations of learning problems, lack of a manner for eliminating the source or sources of dysfunction, and inadequate coping or compensatory mechanisms that do not address the source(s) at all.

The systems that are currently in place and available to individuals seeking help in this area often do not test for, emphasize, nor seek treatment for any dysfunction or lack of development within an individual's vision system.

OBJECTS AND SUMMARY OF THE INVENTION

Accordingly, it is an object of the present invention to facilitate the screening of aspects of vision development and visual processing, over the Internet or other network, that impact academic learning.

Yet another object of the present invention is to inform parents and other interested parties of the nature of the relationship between vision capabilities and learning disabilities to ensure that a major source of difficulty not be ignored to the detriment of those individuals who have a learning-related vision dysfunction.

Still another object of the present invention is to provide information that an individual can use to obtain thorough evaluation and treatment for a problem that affects learning.

The aforesaid objects may be achieved individually and/or in combination, and it is not intended that the present invention be construed as requiring two or more of the objects to be combined unless expressly required by the claims attached hereto.

According to the present invention, a screening evaluation tool provides instructions and mechanisms to probe areas of vision (related to learning). These areas include eye movements used during reading, visual imagery of mental pictorial images generated by viewing, visual recall of mental pictorial images maintained over time, mental manipulation of pictorial images transformed spatially and visual manipulation of mental pictorial images viewed from multiple spatial perspectives. The screening may be conducted remotely from any physical location via the Internet or other network. In addition, the present invention may be utilized for performing therapy, screening tests or more formal evaluations over the Internet. The screening tests and evaluations may be of multiple varieties and are made available for the purpose of further exploring or ruling out the need for further exploration of areas of dysfunction that relate to reduced performance in learning.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIGS. 29A-29D are exemplary illustrations of a graphical user screen presenting screening results.

DETAILED DESCRIPTION OF THE
PREFERRED EMBODIMENTS

Figure 1:
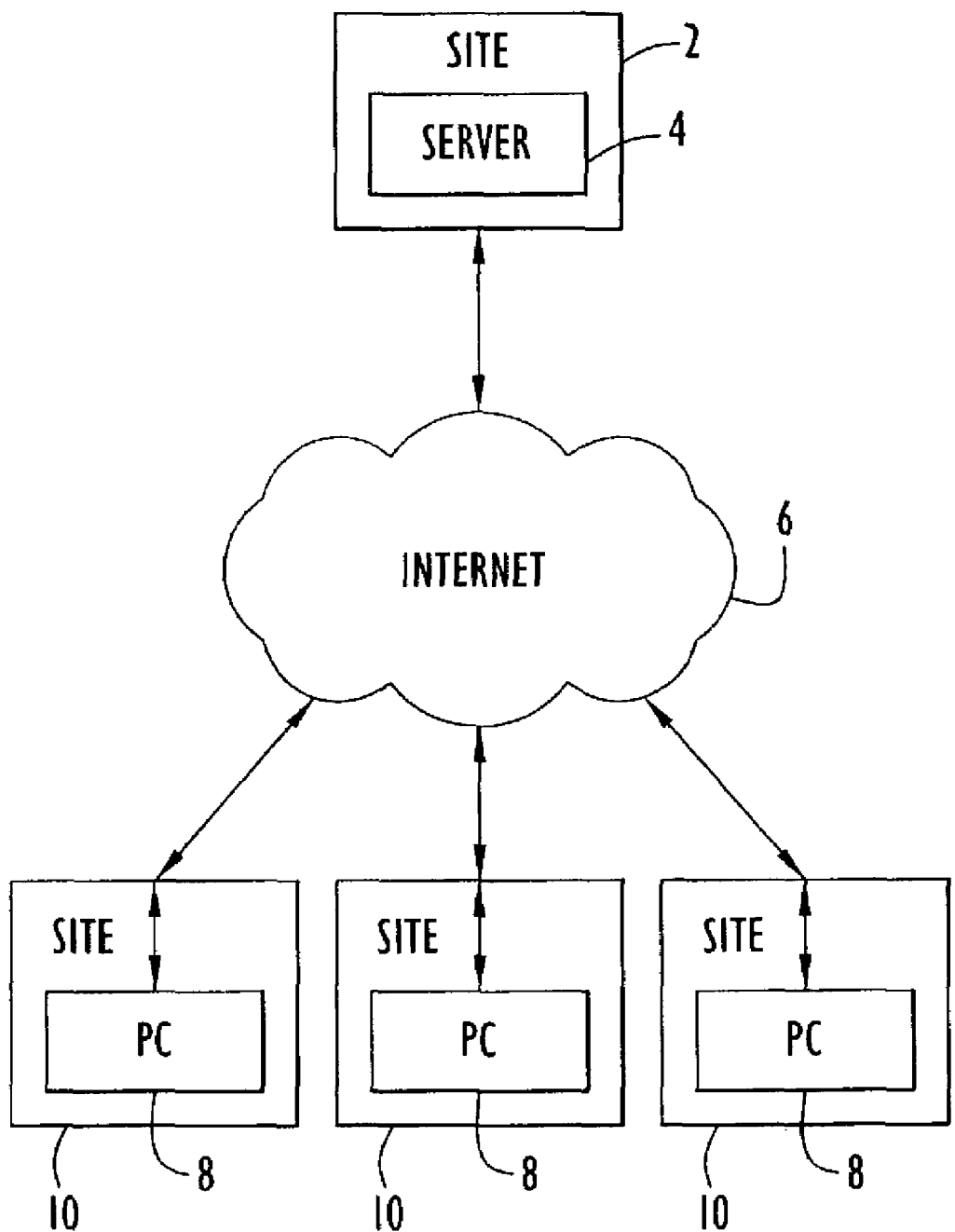
FIG. 1 is a diagrammatic illustration of an exemplary system for facilitating vision screening via the Internet from a user computer at a remote site.

An exemplary system for performing vision screening of end users from remote computer systems is illustrated in FIG. 1. Specifically, the system includes one or more end user systems 8 and a server computer system 4 wherein the server system is in communication with each of the end user systems via the internet or other network 6. The end user systems typically reside at different end user sites 10, presumably the end user's home, and are generally implemented by a personal or laptop computer. Specifically, the end user computer systems may be conventional IBM-compatible or other types of personal computers preferably equipped with a monitor, base including the processor, memories and internal or external communications devices or modems, keyboard and optional mouse or other input device. The end user systems each include software (e.g., operating system, Internet browser, etc.) to communicate with server system 4 and appropriate components (e.g., processor, disk storage or hard drive, etc.) having sufficient processing and storage capabilities to effectively execute that software. The end user systems may utilize any of the major platforms (e.g., Linux, Macintosh, Unix, OS2, Windows, etc.). Similarly, server system 4 is typically implemented by a conventional personal or other suitable computer system preferably equipped with a display or monitor, a base including the processor, memories and internal or external communication devices (e.g., modem, network cards, etc.)), keyboard and optional mouse or other input device. The server system includes software (e.g., operating system, server software, screening tool software, etc.) to communicate with end user systems 8 and process screening requests, and appropriate components (e.g., processor, disk storage or hard drive, etc.) having sufficient processing and storage capabilities to effectively execute that software. The server system may utilize any of the commercially available operating systems and/or server software, and, under software control, implements the screening tool of the present invention for processing screening requests from the end user computer systems. The screening tool is preferably implemented in Java Script and Java Server Pages, but may be implemented in any suitable computer language. Server system 4 resides at a service provider or host site 2, wherein the vision screening requests are serviced. The vision screening is performed by a user on an end user system 8 as described below.

Figure 2:
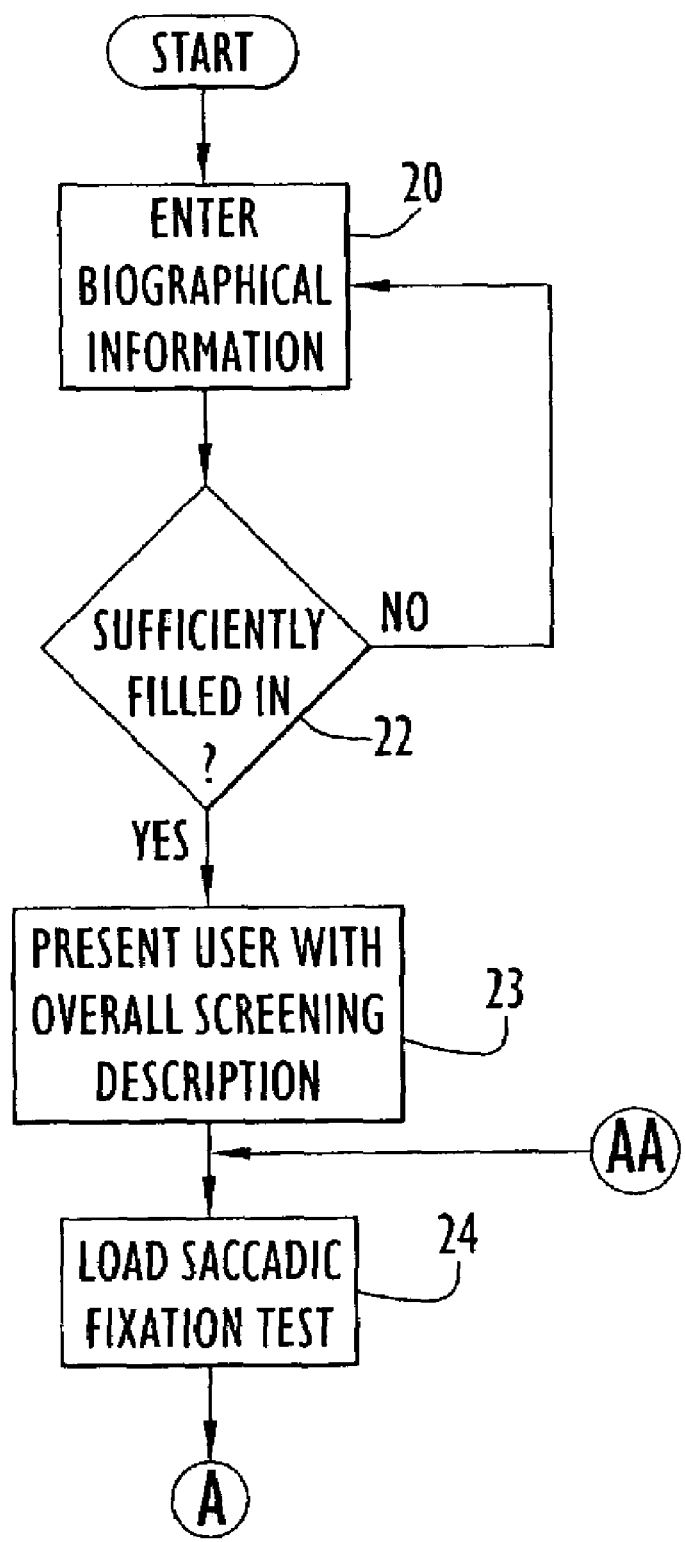
FIGS. 2-21 are procedural flowcharts illustrating the manner in which a vision screening is processed according to the present invention. In particular, the flow charts illustrate the manner in which a user initially enters and receives information (FIG. 2), the manner in which the saccadic fixation (FIGS. 2-5), visual imagery (FIGS. 6-9), visual memory (FIGS. 9-12), perspective (FIGS. 13-15) and transformation (FIGS. 16-18) tests are conducted; the manner in which screening results are displayed (FIG. 19); and the manner in which help (FIG. 20) and examples (FIG. 21) are presented.
Figure 3:
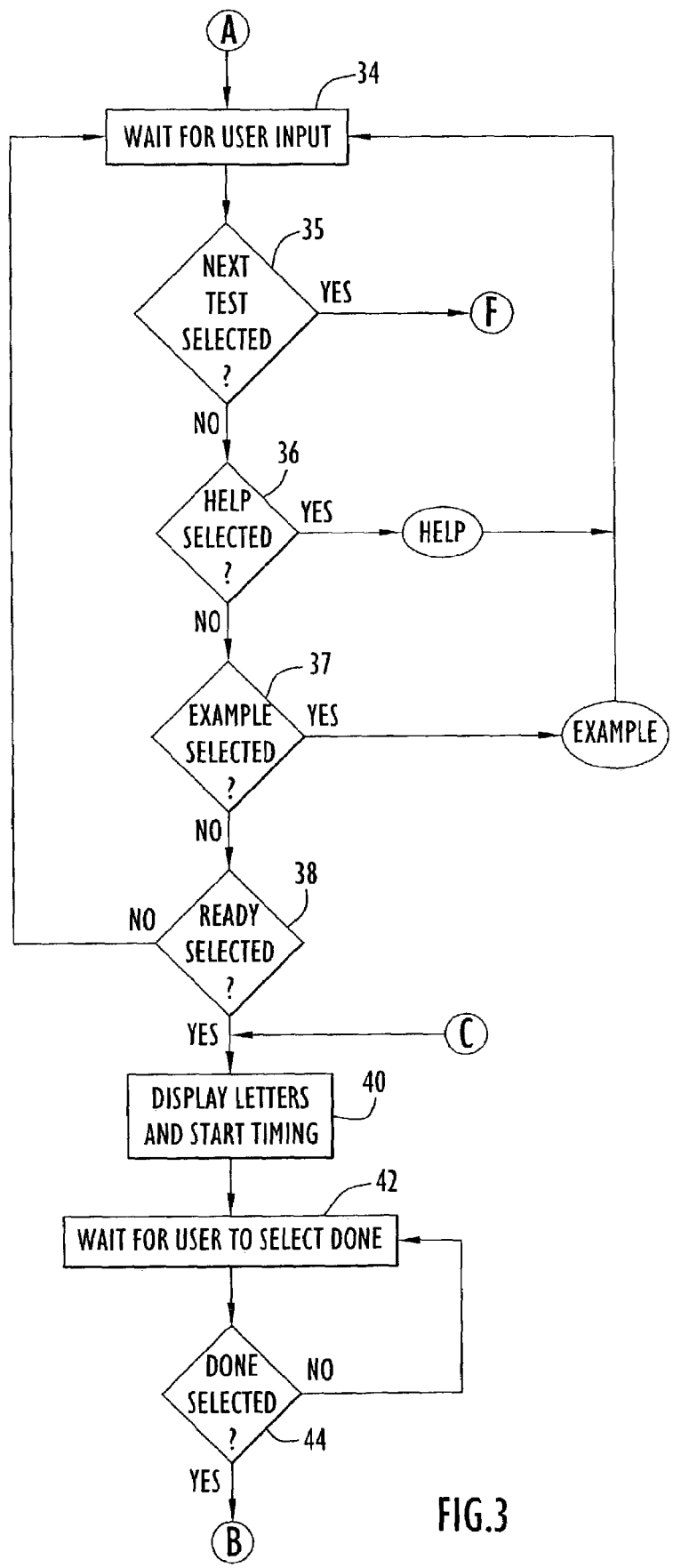
Figure 22:
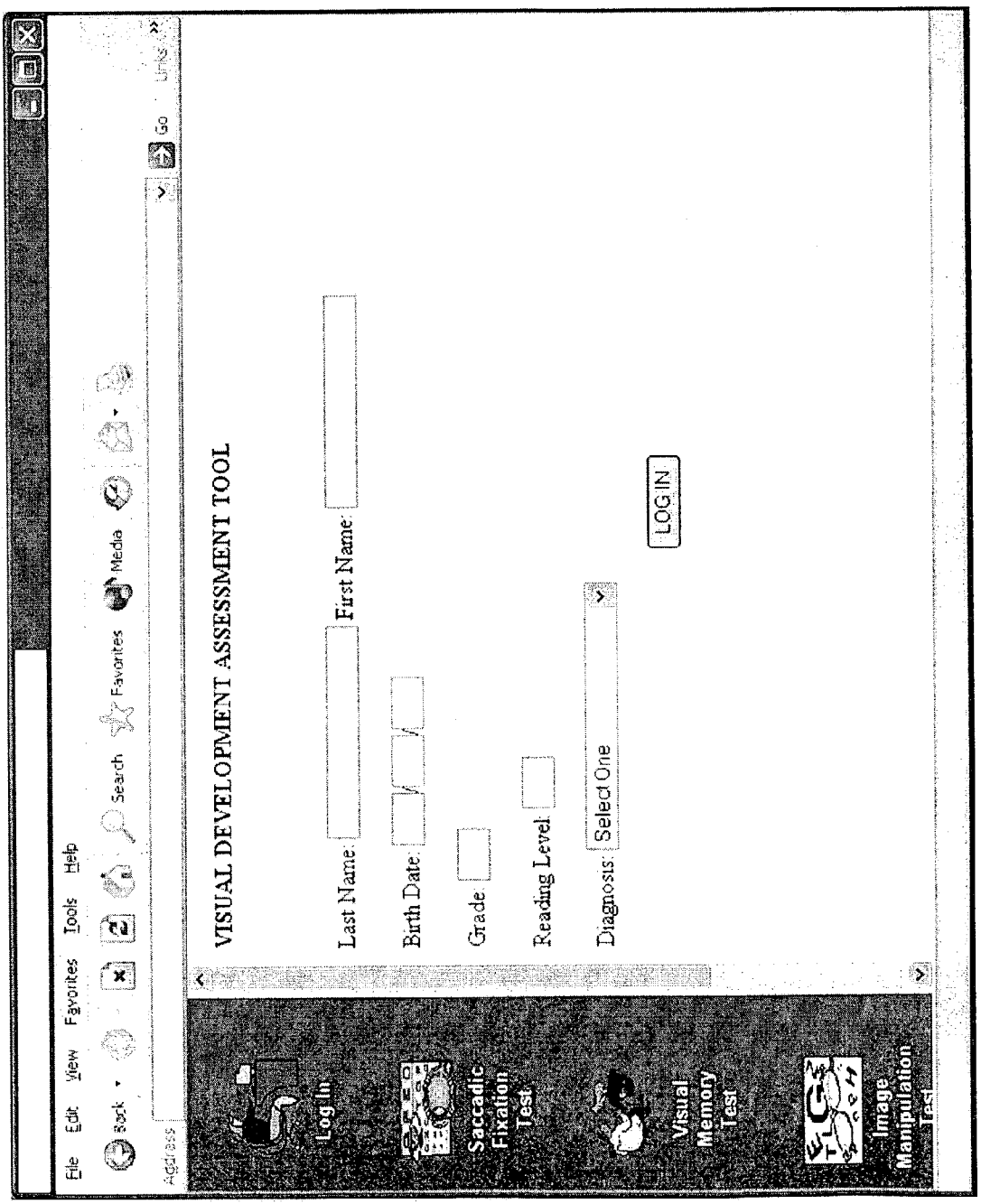
FIG. 22 is an exemplary illustration of a graphical user screen for system login.
Figure 23:
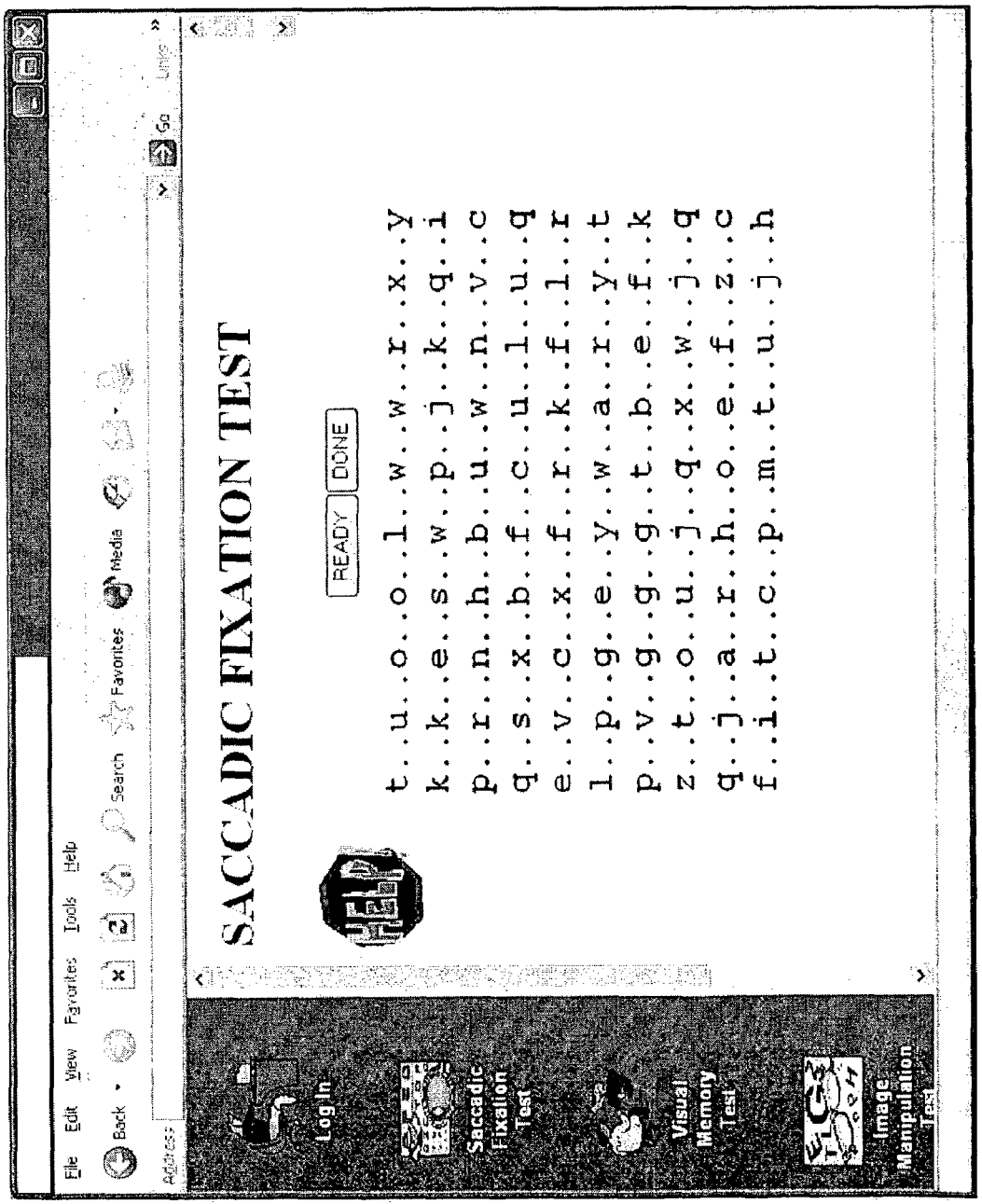
FIG. 23 is an exemplary illustration of a graphical user screen for the saccadic fixation test.

The manner in which a vision screening is performed is illustrated in FIGS. 2-21. Initially, an end user accesses the screening tool residing on server system 4 via an end user system 8 and network 6 to conduct a screening from a remote site. In particular and referring to FIGS. 2-5, the user enters biographical information requested by the tool at step 20 (FIG. 2) on a tool login screen (FIG. 22). If the biographical information is sufficiently filled in as determined at step 22, an overall screening description is presented to the user at step 23. Once the user closes this description, the saccadic fixation test is loaded into the user system at step 24. Saccadic movements are the very quick, relatively short eye movements that are utilized constantly during the act of reading. The movements are from word to word and from the end of one line to the beginning of the next line. The eyes stop after each saccadic movement and fixate on the area of print upon which the movement has landed. In the ocular saccadic movement test, an individual recites out loud the first and last numbers, letters or shapes displayed on lines, preferably ten, on the screen (FIG. 23). The test is scored for time and accuracy and reported against the norm for a corresponding user age as described below. When the test loads at step 24, the user enters information at step 34 (FIG. 3) to either navigate to the next test as determined at step 35, view help information for the test as determined at step 36, view an example of the test as determined at step 37 or start the test as determined at step 38. These functions are preferably invoked by appropriate buttons displayed on the screen.

Figure 20:
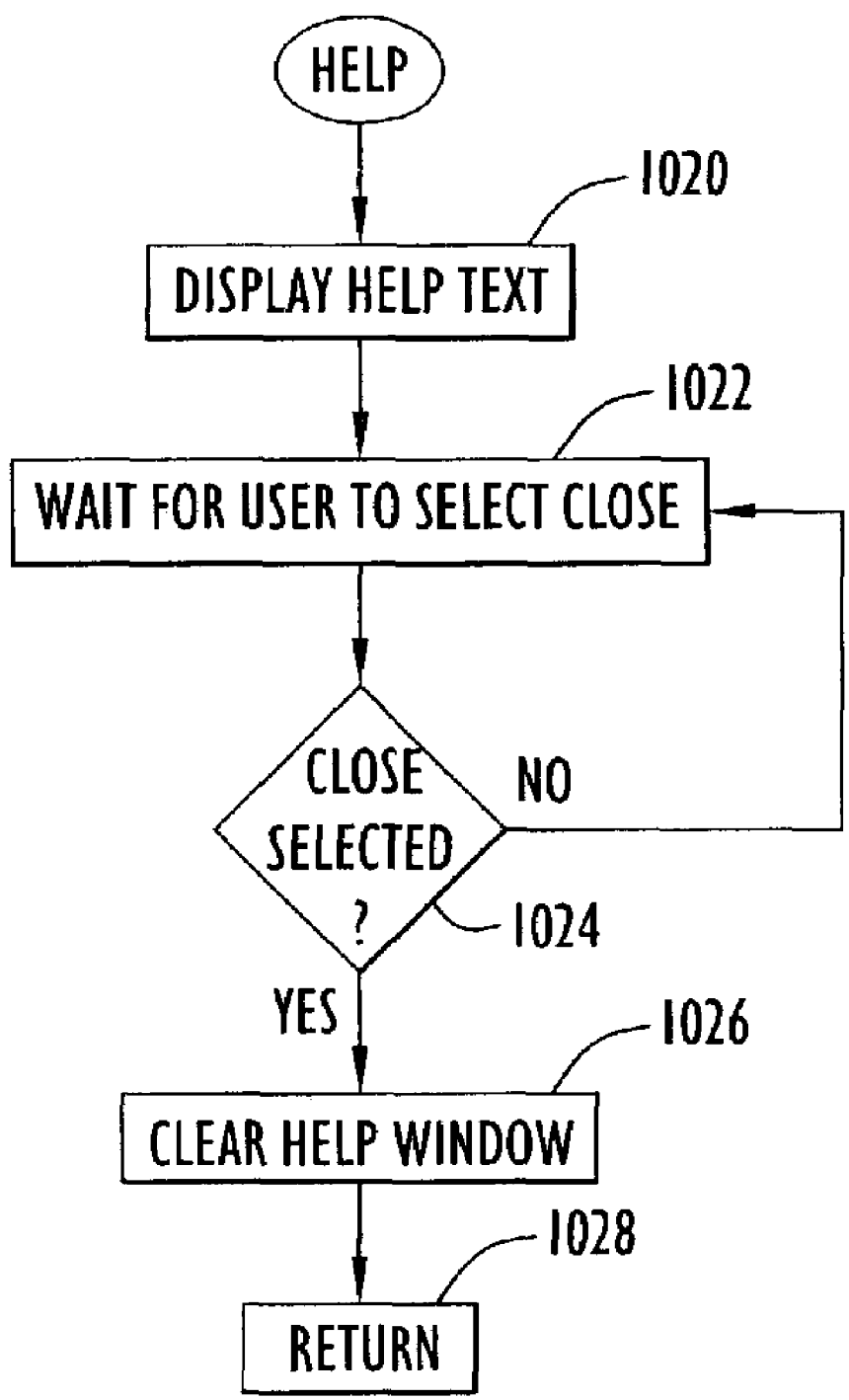

If help is selected as determined at step 36, a help screen is presented as illustrated, by way of example only, in FIG. 20. Specifically, the help screen is displayed with context sensitive textual information at step 1020. If the user selects close (e.g., clicks on a close button) as determined at steps 1022, 1024, the help window is cleared at steps 1026, 1028 and the user returns to step 34 to either navigate to the next test, view help information for the test, view an example of the test or start the test as described above.

Figure 21:
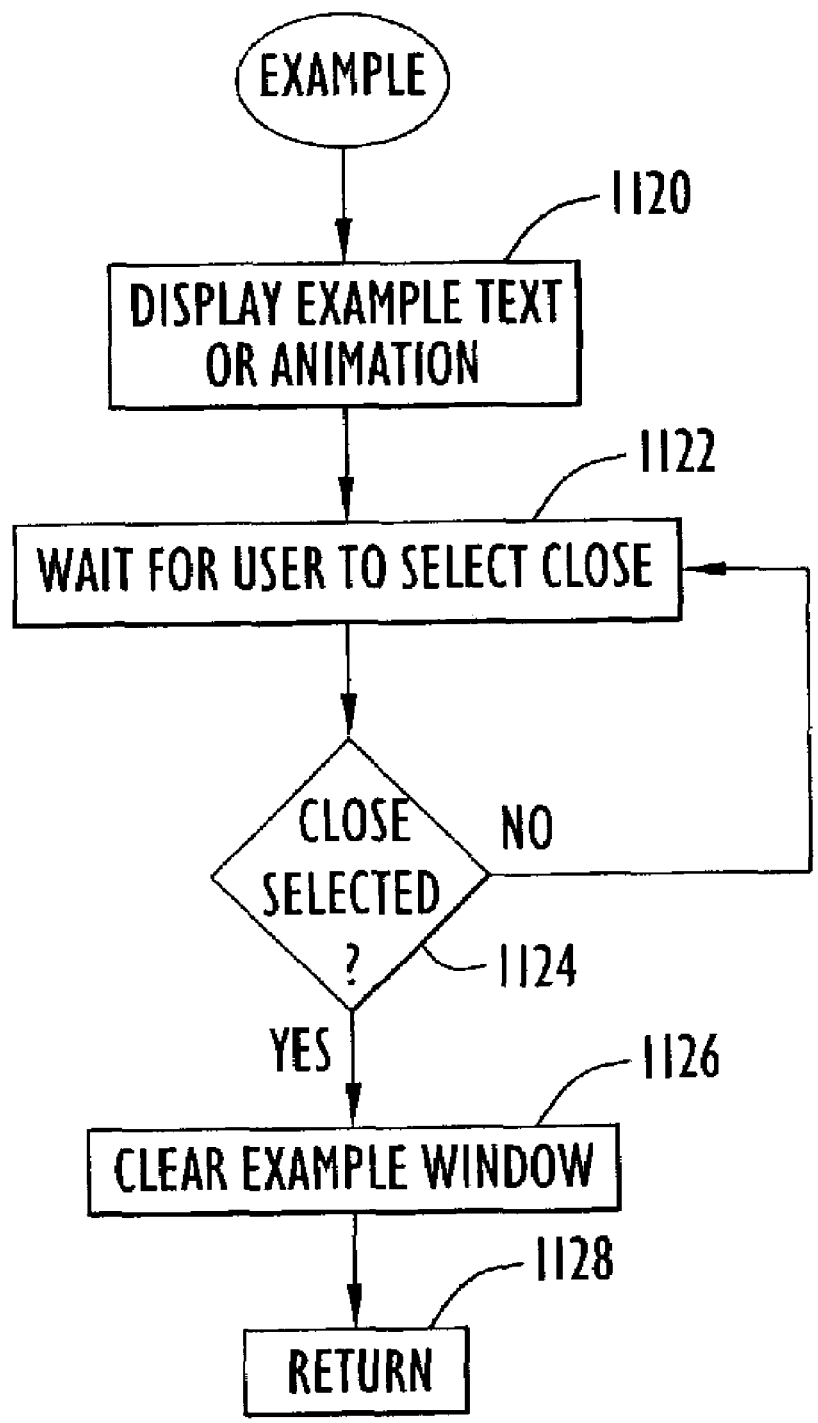

If the user selects an example as determined at step 37 (FIG. 3), an example screen is displayed as illustrated, by way of example only, in FIG. 21. Specifically, the example screen is presented to the user with text or a context sensitive animation reflecting the operation of the test at step 1120. If the user selects close (e.g., clicks on a close button) as determined at steps 1122, 1124, the example window is cleared at steps 1126, 1128 and the user returns to step 34 to either navigate to the next test, view help information for the test, view an example of the test or start the test as described above.

Figure 4:
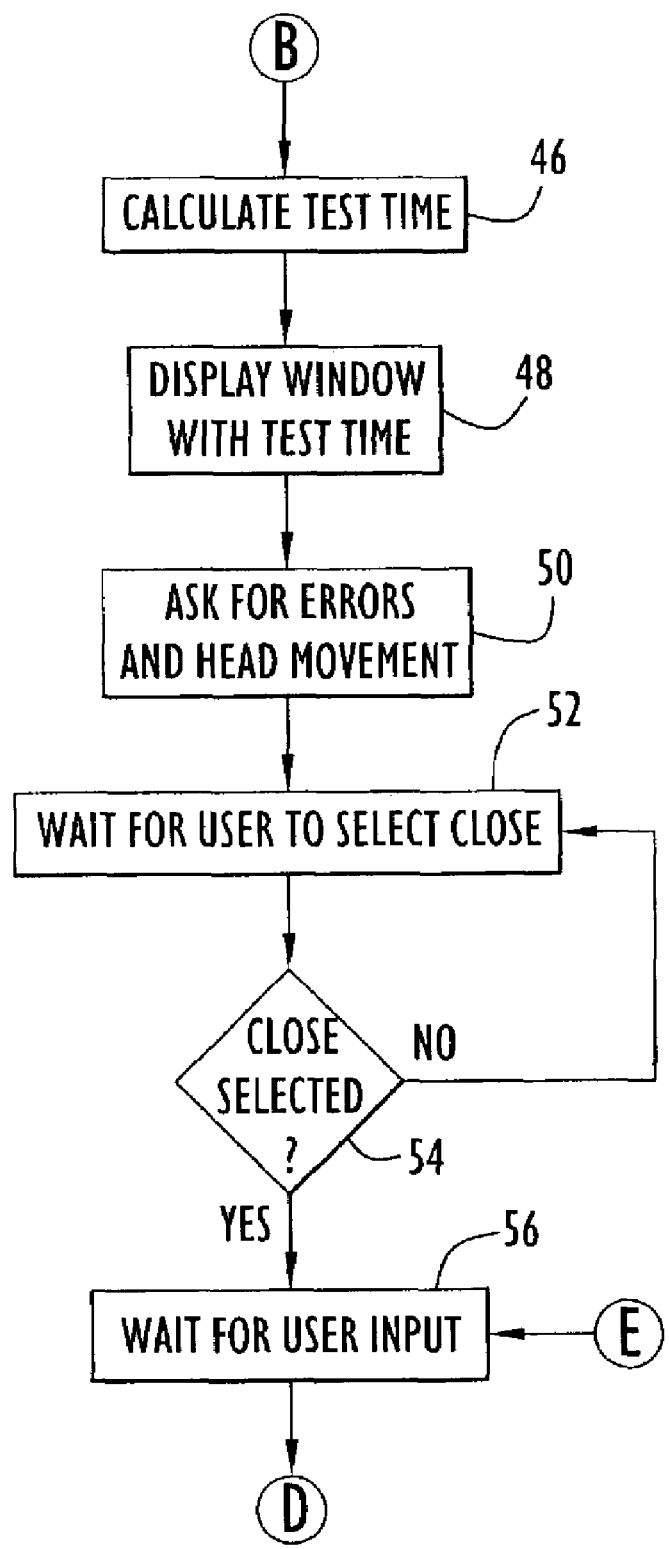
Figure 5:
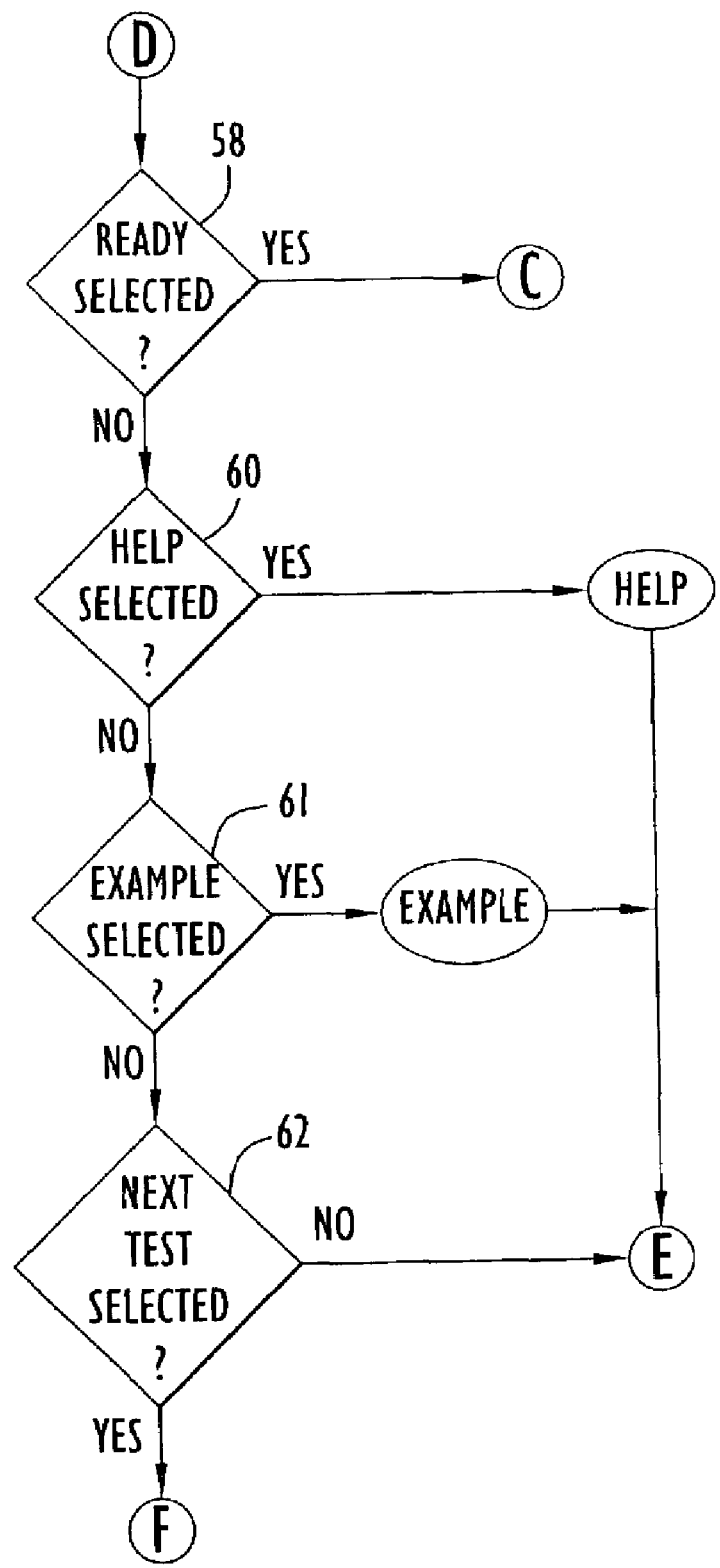
Figure 24:
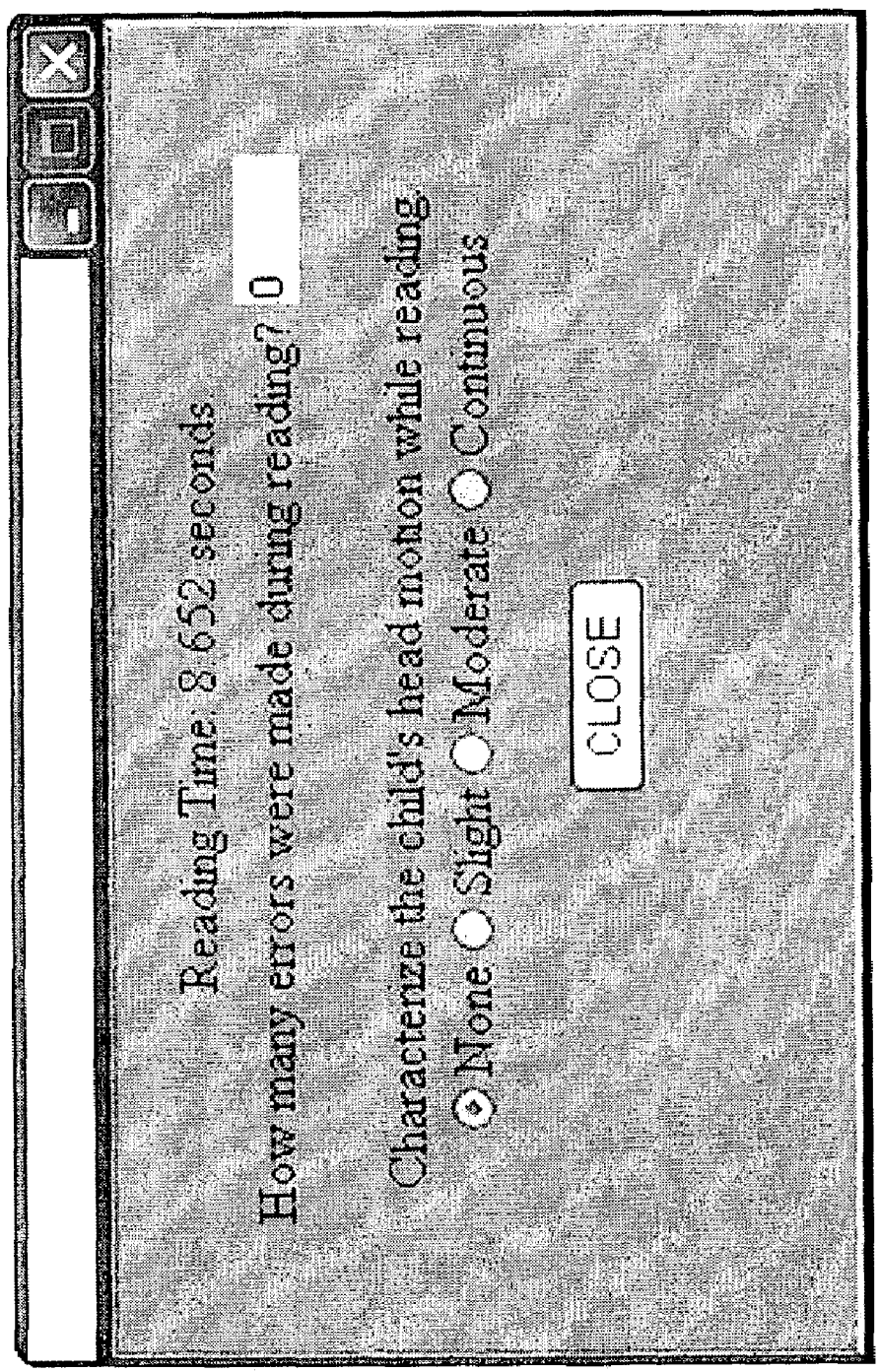
FIG. 24 is an exemplary illustration of a graphical user screen requesting information observed during the saccadic fixation test.

Referring back to FIG. 3, if the user selects to start the test by clicking the READY button (FIG. 23) as determined at step 38, the lines containing letters are displayed on the screen as described above and the timing for the test is started at step 40. The user performs the saccadic movement test as described above, and when the user clicks the DONE button (FIG. 23) as determined at steps 42, 44, the test time is calculated at step 46 (FIG. 4) and a window (FIG. 24) is displayed to the user that presents the test time and asks for user input on reading errors and head movement during the test at steps 48, 50 (FIG. 4). When the user enters this information and closes the window as determined at steps 52, 54, the window is cleared and the user may enter information at step 56 to either start the test, view help information for the test, view an example of the test or navigate to the next test via corresponding steps 58, 60, 61, 62 (FIG. 5). If the user feels the test has been preformed to the best of their ability and that the test time cannot improve, the user will choose to proceed to the next test at step 62.

Figure 6:
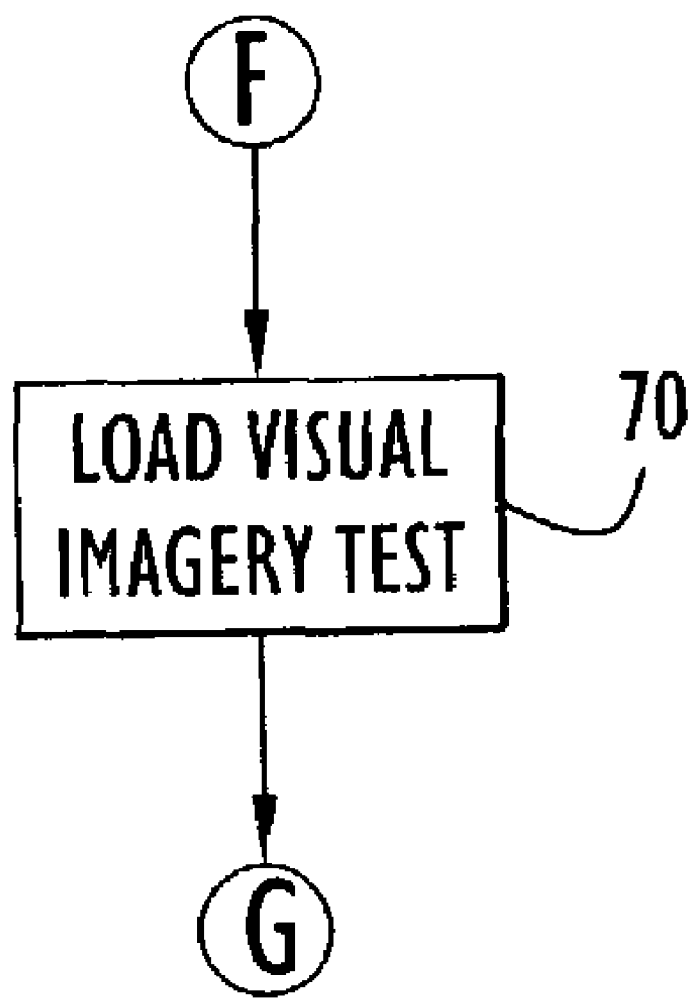
Figure 7:
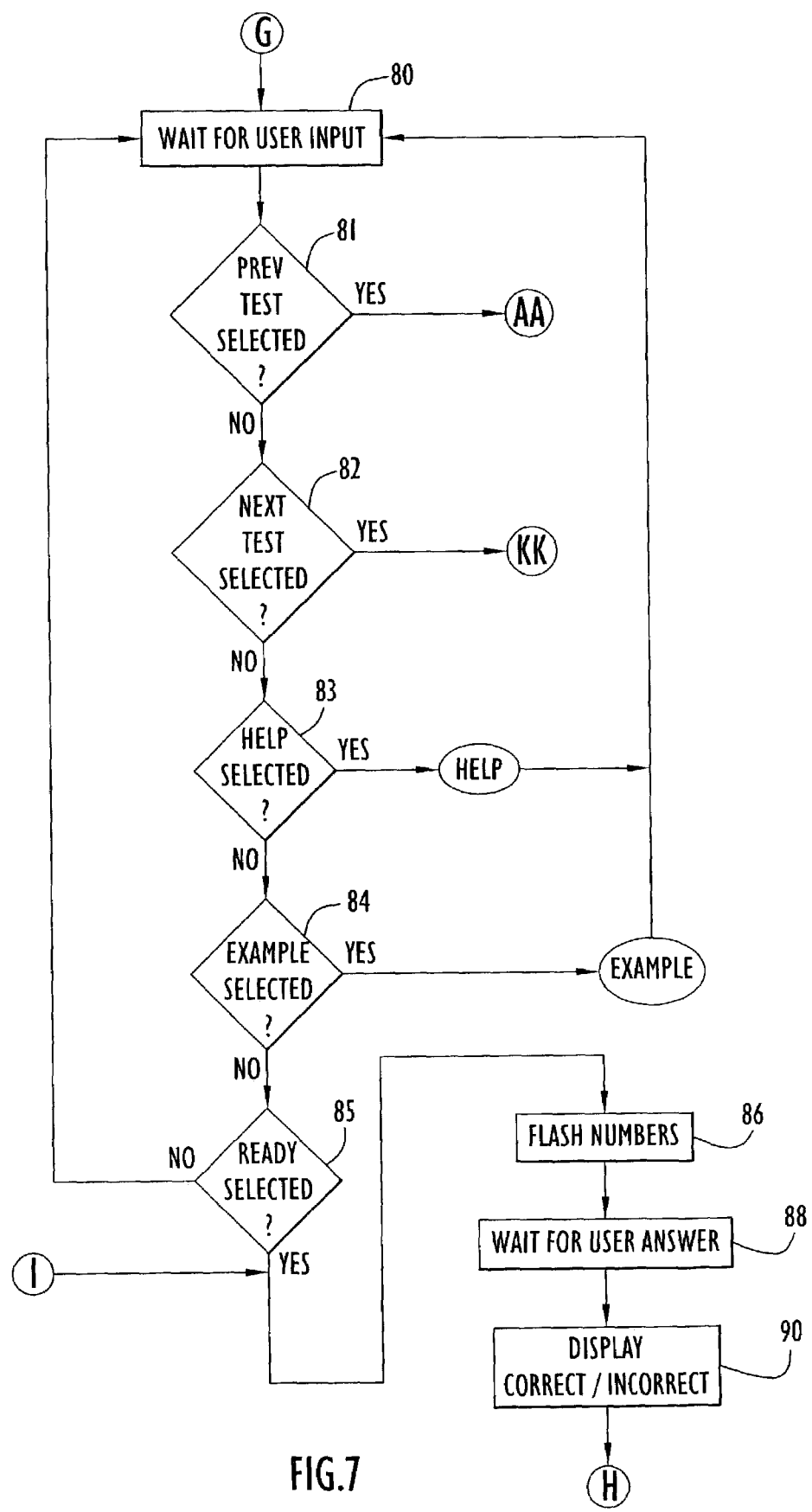
Figure 25:
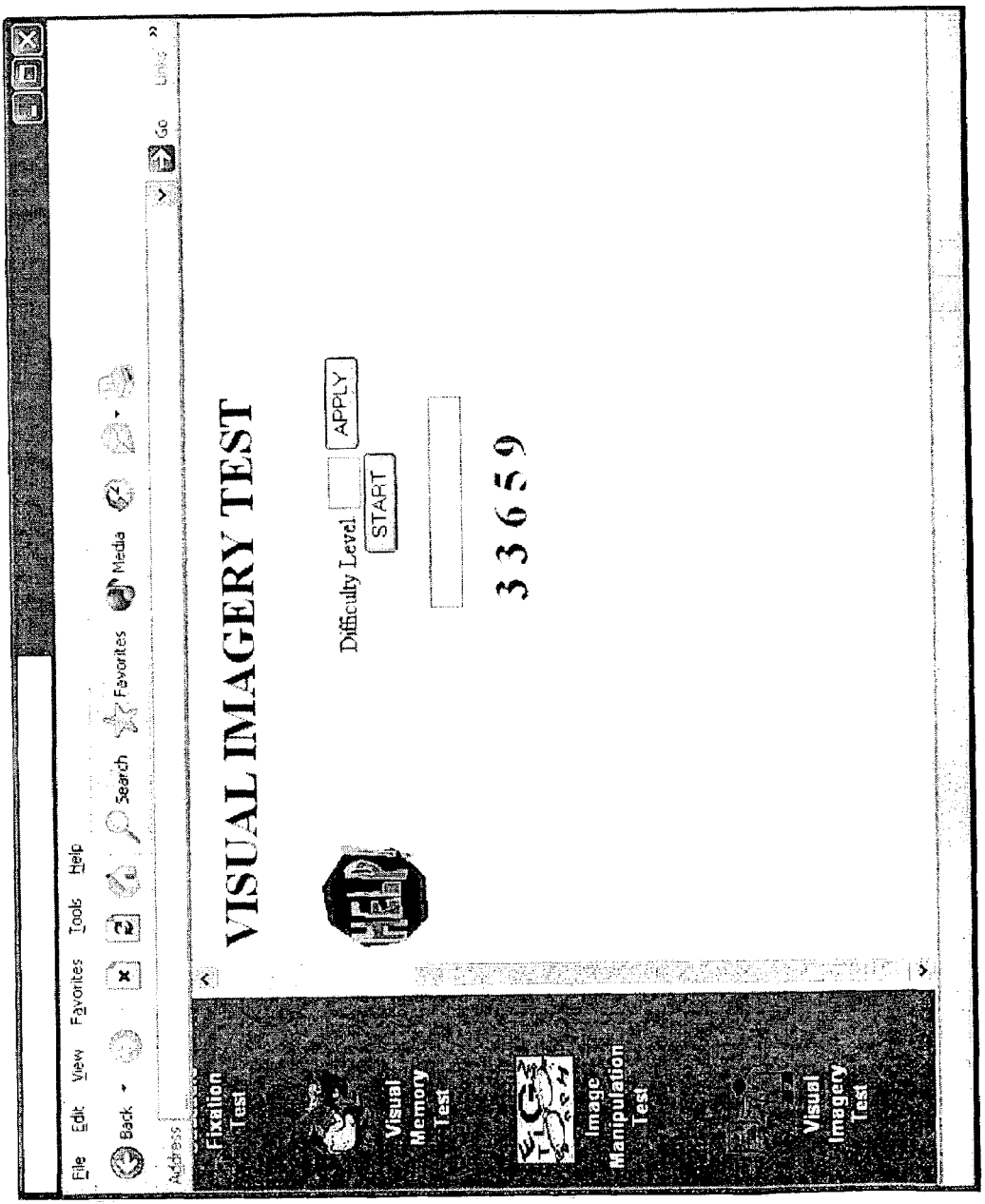
FIG. 25 is an exemplary illustration of a graphical user screen for the visual imagery test.

Referring to FIGS. 6-9, once the user proceeds to the next test, the visual imagery test is loaded into the user system at step 70 (FIG. 6). Visual imagery is the immediate pictorial image that an individual constructs upon viewing. The construction of a mental pictorial image is at the discretion of the viewer (e.g., one may retain or discard a given image) if that individual has developed the capacity to effect such a construction. In the visual imagery test, a tachistoscopic (e.g., flash) technique is utilized. The presentation of a series of numbers (FIG. 25) increase in difficulty (e.g., quantity of digits presented) and in flash speed as success is obtained. The speed of presentation increases until the speed is faster than human eyes can move. At that point, the individual must rely strictly upon visual imagery (e.g., a mental snapshot) in order to succeed. The results are reported against the norms for a corresponding user age level as described below. Upon loading at step 70, the user enters information at step 80 (FIG. 7) to either navigate to a previous test as determined at step 81, navigate to the next test as determined at step 82, view help information for the test as determined at step 83, view an example of the test as determined at step 84, or start the test as determined at step 85. These functions are preferably invoked by appropriate buttons displayed on the screen.

If help is selected as determined at step 83, a help screen is presented with context sensitive textual information as described above for FIG. 20. If the user selects close (e.g., clicks on a close button) as determined at steps 1022, 1024 (FIG. 20), the help window is cleared at steps 1026, 1028 and the user returns to step 80 to either navigate to the previous or next test, view help information for the test, view an example of the test or start the test as described above.

If the user selects an example as determined at step 84, an example screen is presented to the user with text or a context sensitive animation reflecting the operation of the test as described above for FIG. 21. If the user selects close (e.g., clicks on a close button) as determined at steps 1122, 1124 (FIG. 21), the example window is cleared at steps 1126, 1128 and the user returns to step 80 to either navigate to the previous or next test, view help information for the test, view an example of the test or start the test as described above.

Figure 8:
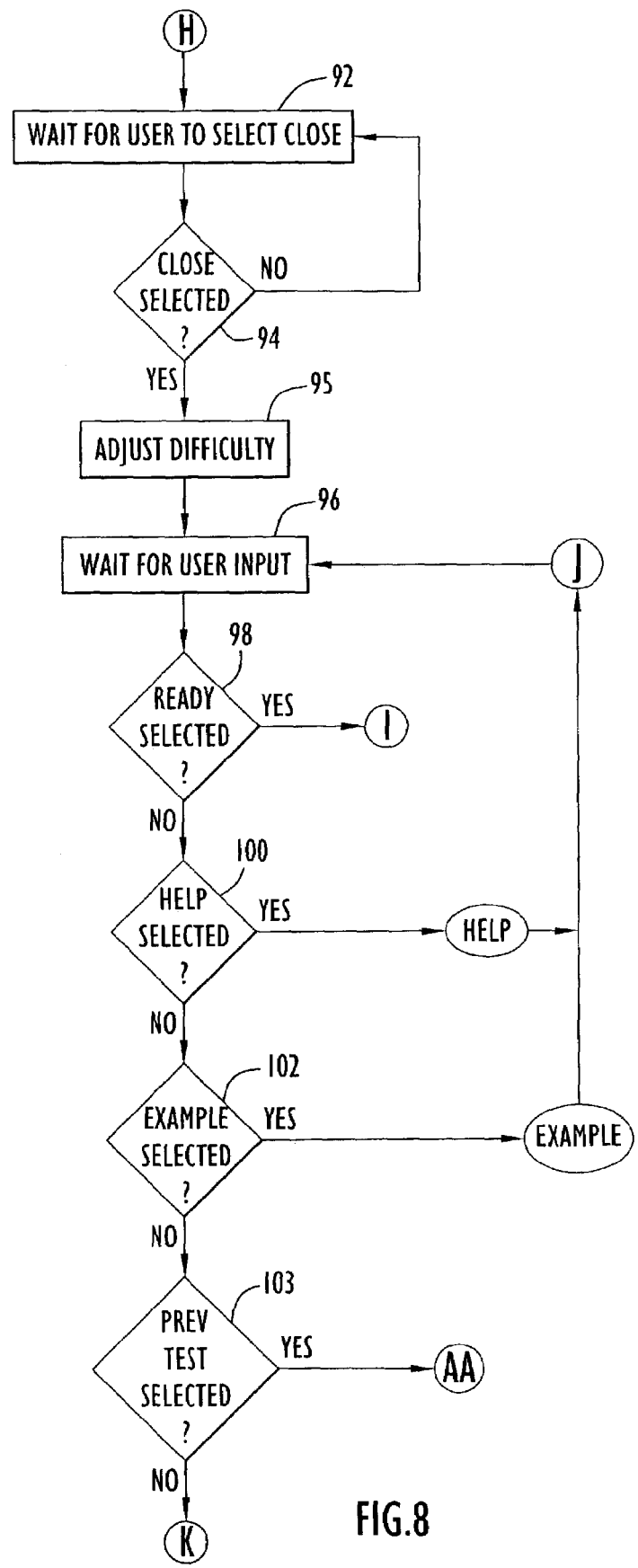
Figure 9:
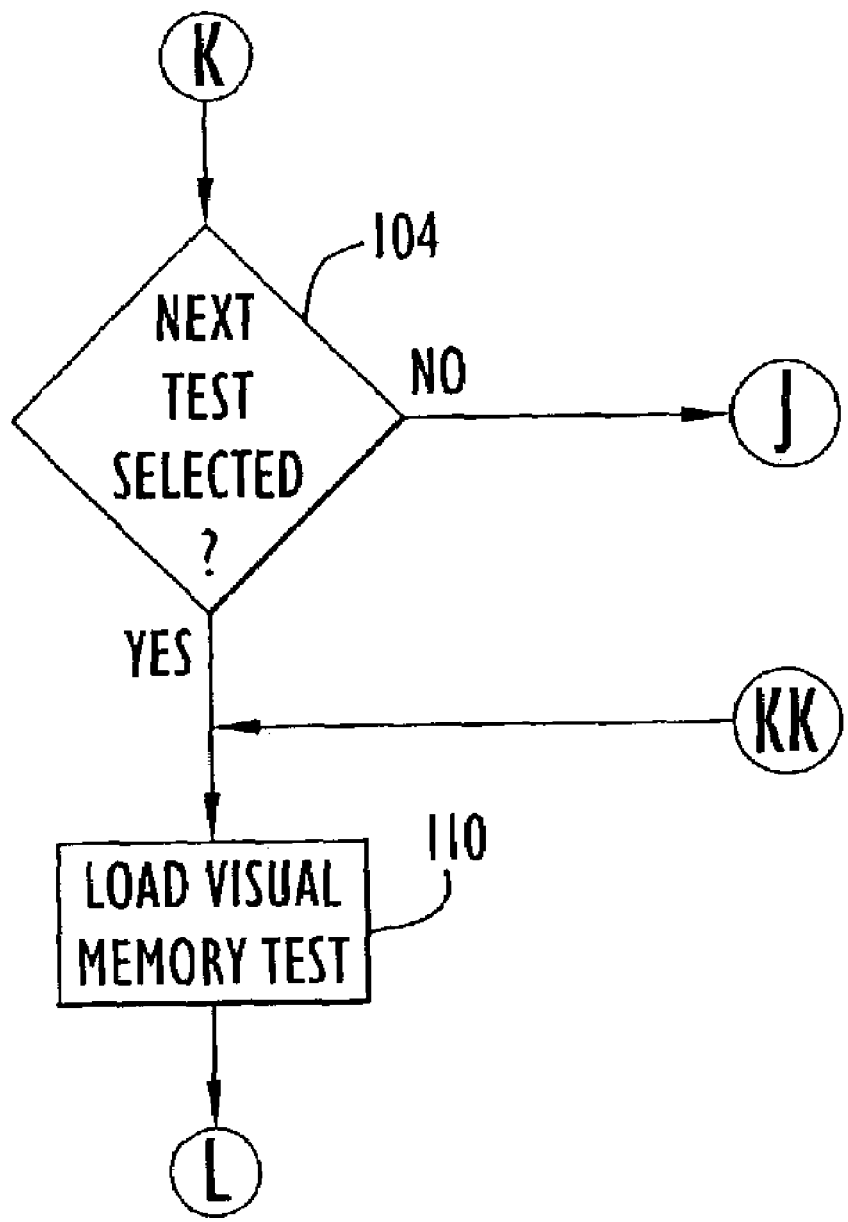
Figure 10:
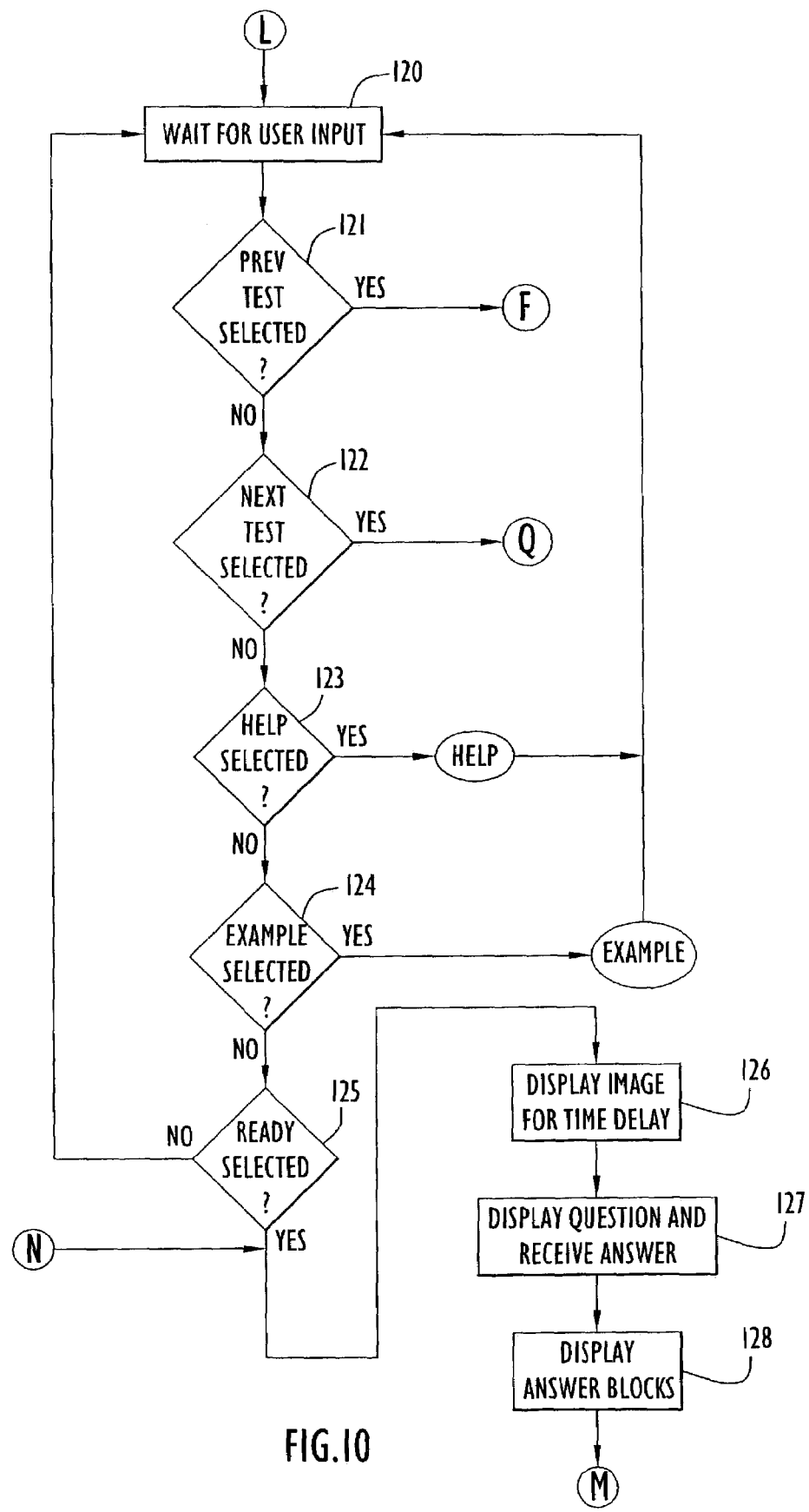

If the user selects to start the test by clicking the START button (FIG. 25) as determined at step 85 (FIG. 7), a set of numbers is flashed to the user at step 86 as described above. The quantity of numbers in the set and the time for which they are flashed are determined by the difficulty level and the number of correct answers given thus far by the user, respectively. When the user enters the answer (e.g., the number sequence) at step 88, the answer is evaluated and a correct/incorrect indication is displayed at step 90. If the user enters the incorrect answer, the correct answer is shown for proper feedback. Once the user closes the correct/incorrect indication as determined at steps 92, 94 (FIG. 8), the time for which the numbers are flashed before the user is adjusted; shorter for a correct answer and longer for an incorrect answer. The test difficulty (e.g., quantity of numbers flashed) may also be adjusted upward at step 95 if the user is having considerable success at the current level. At this point, the user may enter information at step 96 to restart the test, view help information for the test, view an example of the test, navigate to the previous test or navigate to the next test via corresponding steps 98, 100, 102, 103 and 104 (FIGS. 8-9). If the user feels the test has been performed to the best of their ability and cannot improve, the user will choose to proceed to the next test at step 104.

Figure 26:
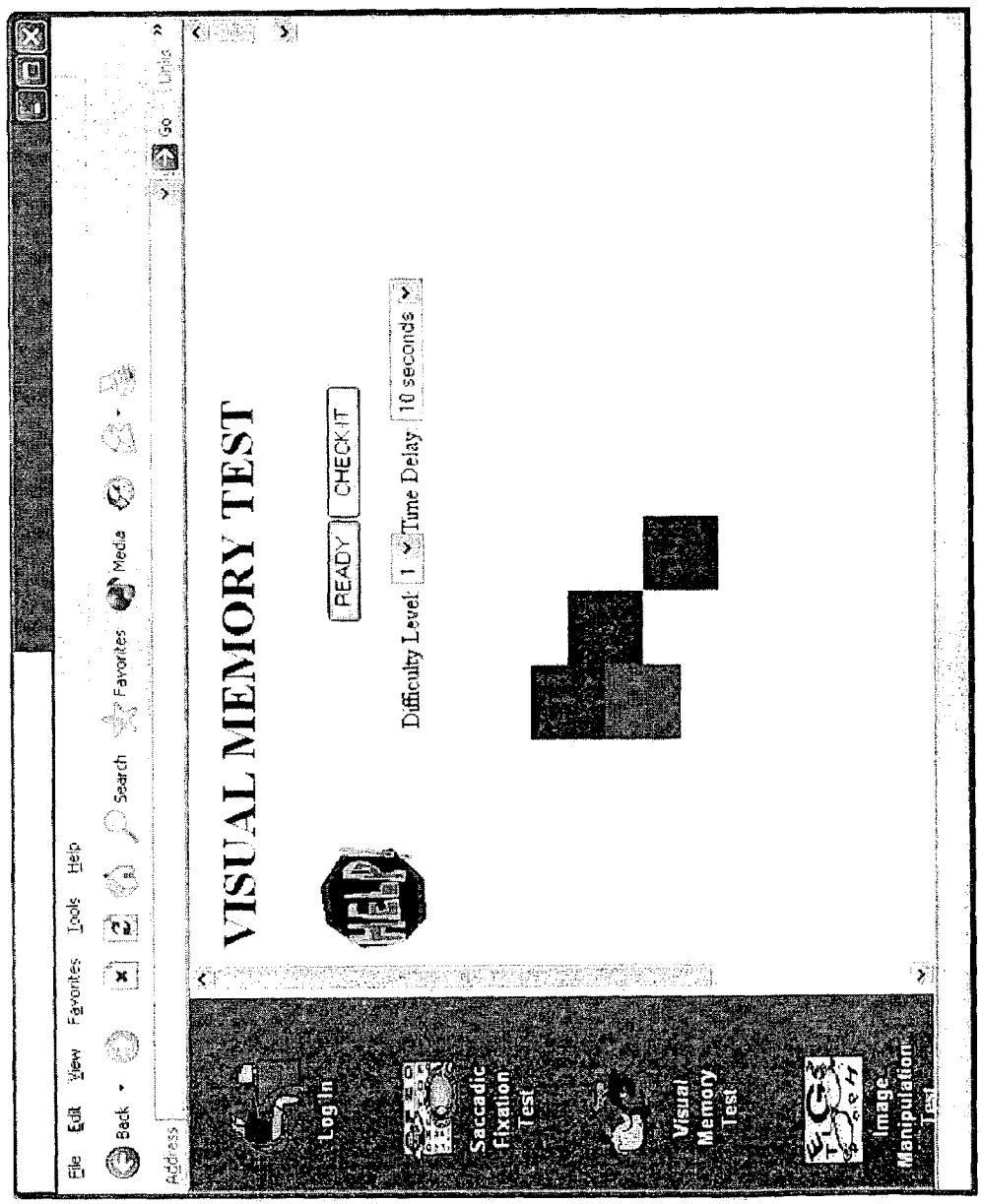
FIG. 26 is an exemplary illustration of a graphical user screen for the visual memory test.

Referring to FIGS. 9-12, once the user proceeds to the next test, the visual memory test is loaded into the user system at step 110 (FIG. 9). Visual recall is related to an individual's sight word vocabulary and spelling ability. In the visual thinking-recall test, a block pattern (e.g., squares) is initially viewed by the individual (FIG. 26). Subsequently, a question is presented in written form that is answered by the individual and the blocks are presented again in a random pattern, at which time the individual moves (e.g., by use of the computer mouse or other input device) the blocks into the identical pattern viewed originally. The individual's recalled pattern is matched against the original presentation and "correct" or "incorrect" is signaled to the individual. As success is obtained, difficulty is increased by adding colors to one or more of the blocks and by increasing the complexity of the pattern. Results are reported against norms for a corresponding user age or grade level as described below. Upon loading at step 110, the user enters information at step 120 (FIG. 10) to either navigate to the previous test as determined at step 121, navigate to the next test as determined at step 122, view help information for the test as determined at step 123, view an example of the test as determined at step 124 or start the test as determined at step 125. These functions are preferably invoked by appropriate buttons displayed on the screen.

If help is selected as determined at step 123, a help screen is presented with context sensitive textual information as described above for FIG. 20. If the user selects close (e.g., clicks on a close button) as determined at steps 1022, 1024 (FIG. 20), the help window is cleared at steps 1026, 1028 and the user returns to step 120 to either navigate to the previous or next test, view help information for the test, view an example of the test or start the test as described above.

If the user selects an example at step 124 (FIG. 10), an example screen is presented to the user with text or a context sensitive animation reflecting the operation of the test as described above for FIG. 21. If the user selects close (e.g., clicks on a close button) as determined at steps 1122, 1124 (FIG. 21), the example window is cleared at steps 1126, 1128 and the user returns to step 120 to either navigate to the previous or next test, view help information for the test, view an example of the test or start the test as described above.

Figure 11:
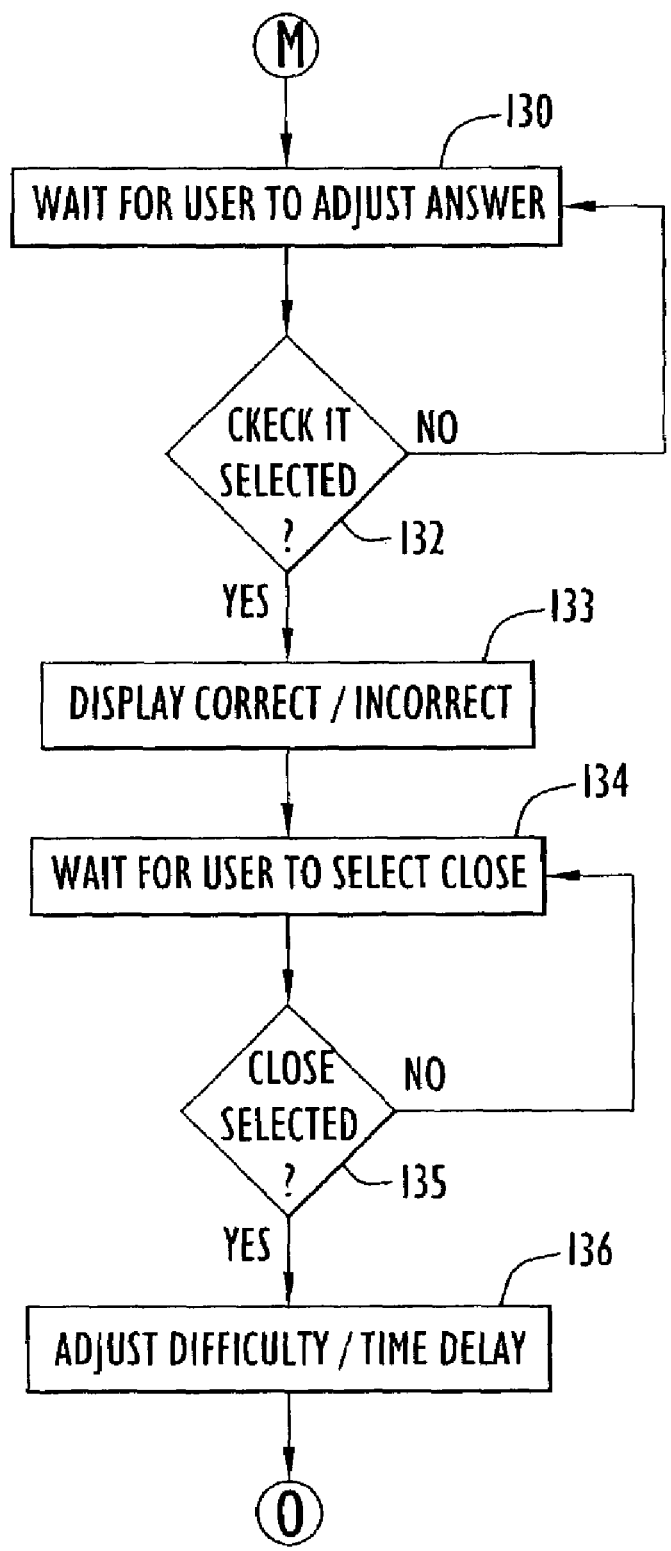
Figure 12:
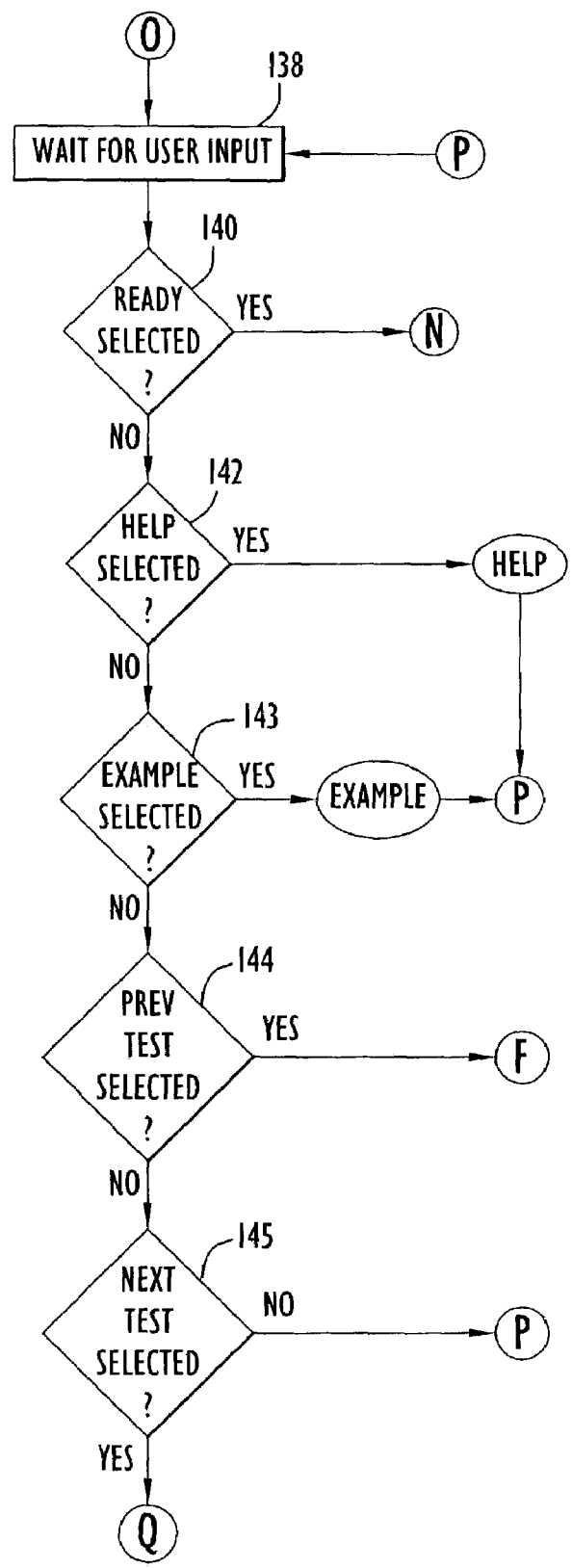

If the user selects to start the test by clicking the READY button (FIG. 26) as determined at step 125 (FIG. 10), an arrangement of colored shapes is presented to the user. The exact orientation of these shapes and the number of colors involved is determined by the difficulty level. This arrangement of shapes is displayed for a specified time delay at step 126. This time delay decreases with each iteration of the test if the user correctly arranges the shapes on the previous iteration. After the arrangement of shapes has been displayed for the specified time delay, a simple unrelated question is asked of the user at step 127. The presentation of this question is such that the question will obstruct from the user's view the shape arrangement. This forces the user to store an image of the shape arrangement in their visual memory in order to recall the arrangement correctly. Once the simple question is answered at step 127, the question is cleared from the screen and the user is presented with the blocks in order to attempt reconstruction of the original arrangement at step 128. The user will drag and drop the answer blocks until the user believes the blocks represent the original arrangement at step 130 (FIG. 11). When done, the user clicks the CHECK IT button (FIG. 26) as determined at step 132. The answer is evaluated and a correct/incorrect indication is displayed at step 133. If the user enters the incorrect answer, the correct answer is shown for proper feedback. Once the user closes the correct/incorrect indication as determined at steps 134, 135, the delay time is adjusted at step 136; shorter for a correct answer and unchanged for an incorrect answer. The test difficulty may also be adjusted upward at step 136 if the user is having considerable success at the current level. At this point, the user may enter information at step 138 (FIG. 12) to either restart the test, view help information for the test, view an example of the test, navigate to the previous test or navigate to the next test via corresponding steps 140, 142, 143, 144, 145. If the user feels the test has been performed to the best of their ability and that test performance cannot improve, the user will choose to proceed to the next test at step 145.

Figure 13:
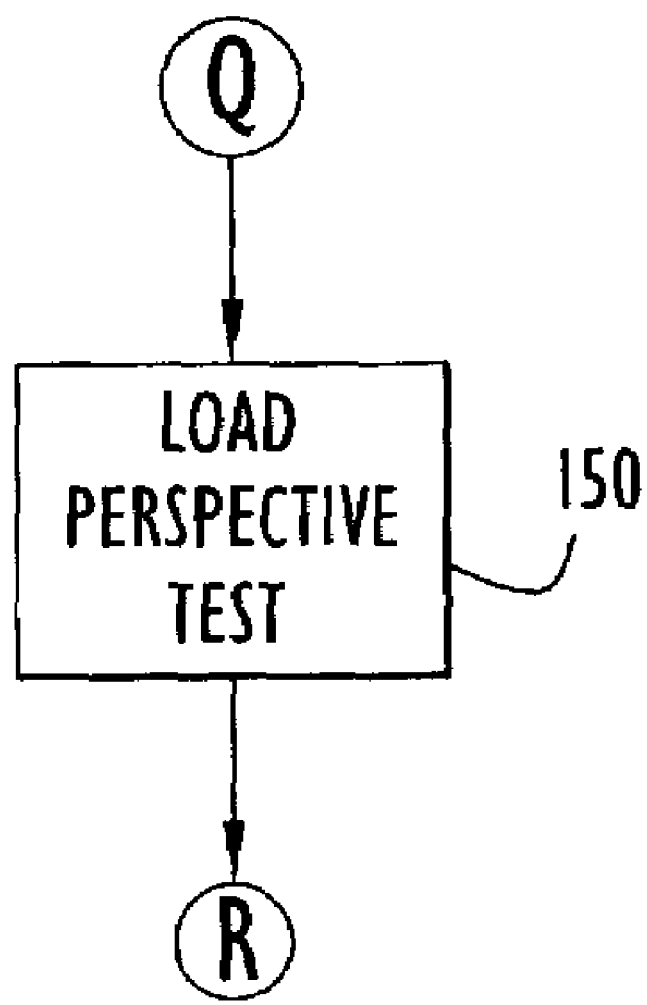
Figure 14:
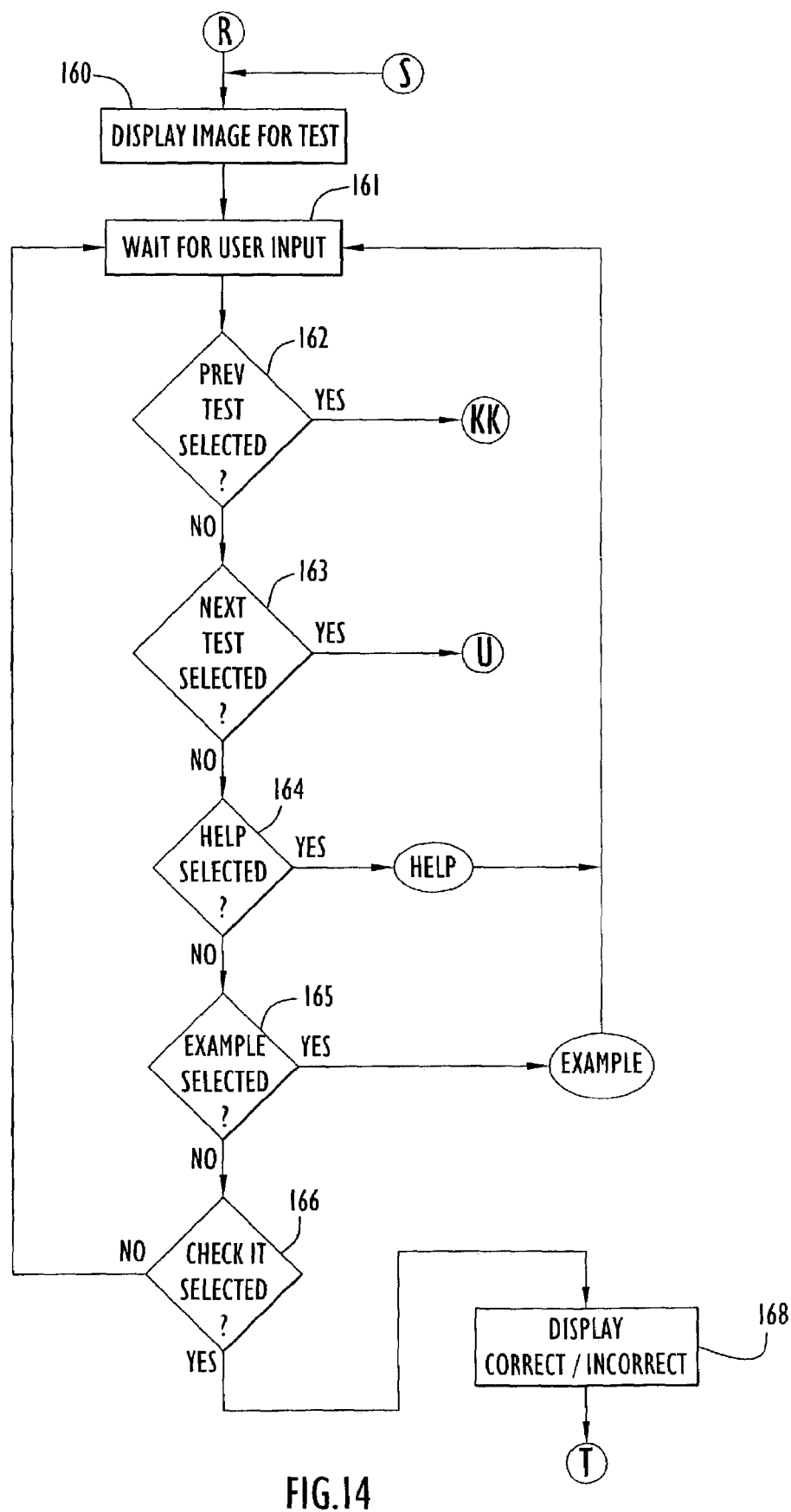
Figure 15:
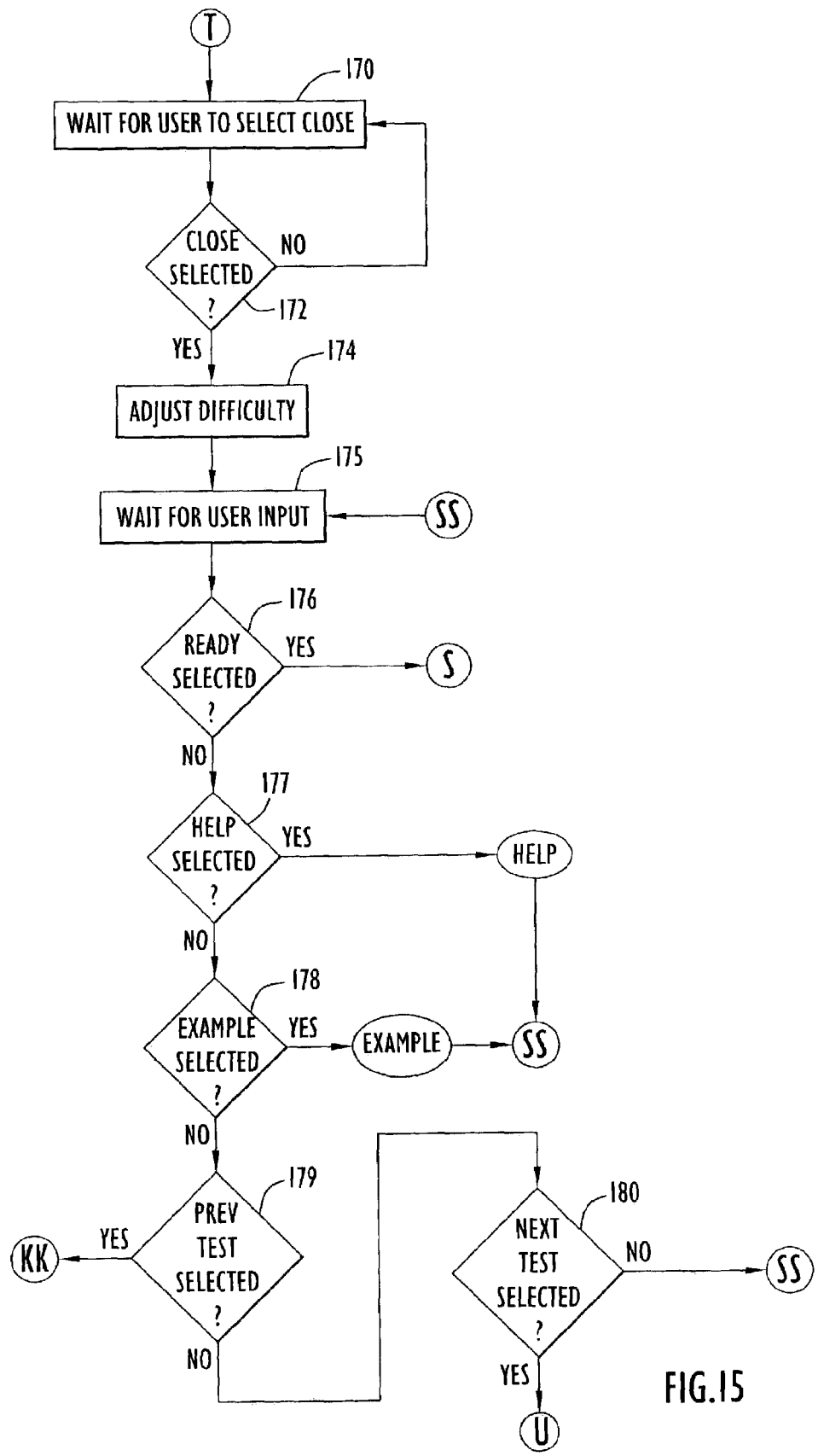

Referring to FIGS. 13-15, once the user moves to the next test, the perspective test is loaded into the user system at step 150 (FIG. 13). Spatial perspective is a capability of visual thinking that develops as an individual takes note of a view that is different from one's current view. If one can mentally construct a view from a perspective that is different from one's current perspective, that person is able to visualize from multiple viewpoints. This ability is helpful in the comprehension of printed material (e.g., viewing meaning from the author's perspective), in the conceptualization of mathematical concepts (e.g., perspectives of number, size, shape), and in studying and taking of tests (e.g., knowledge of what is critically important to the teacher or test constructor). In the visual thinking-spatial perspective test, a pattern of blocks (e.g., composed of squares, triangles, and diamonds) is presented (FIG. 27) and the individual is asked to visualize how that same pattern would look from a different position or perspective (e.g., as noted by the arrow in FIG. 27). The individual then moves a second series of blocks (e.g., with the first presentation of blocks still available for viewing) via the keyboard or mouse into the pattern that would be seen from the requested perspective. When complete, the individual is notified of whether or not the pattern construction is "correct" or "incorrect". As success is obtained, pattern difficulty is increased by adding complexity. Results are reported against norms for a corresponding user age or grade level as described below. Upon loading at step 150, the user is presented with the display image for the test (FIG. 27) with an arrow indicating from which perspective the pattern is to be viewed at step 160 (FIG. 14). At this point, the user enters information at step 161 to either navigate to the previous test as determined at step 162, navigate to the next test as determined at step 163, view help information for the test as determined at step 164, view an example of the test as determined at step 165 or conduct the test as determined at step 166. These functions are preferably invoked by appropriate buttons displayed on the screen.

If help is selected as determined at step 164, a help screen is presented with context sensitive textual information as described above for FIG. 20. If the user selects close (e.g., clicks on a close button) as determined at steps 1022, 1024 (FIG. 20), the help window is cleared at steps 1026, 1028 and the user returns to step 161 to either navigate to the previous or next test, view help information for the test, view an example of the test or conduct the test as described above.

If the user selects an example as determined at step 165, an example screen is presented to the user with text or a context sensitive animation reflecting the operation of the test as described above for FIG. 21. If the user selects close (e.g., clicks on a close button) as determined at steps 1122, 1124 (FIG. 21), the example window is cleared at steps 1126, 1128 and the user returns to step 161 to either navigate to the previous or next test, view help information for the test, view an example of the test or conduct the test as described above.

Figure 27:
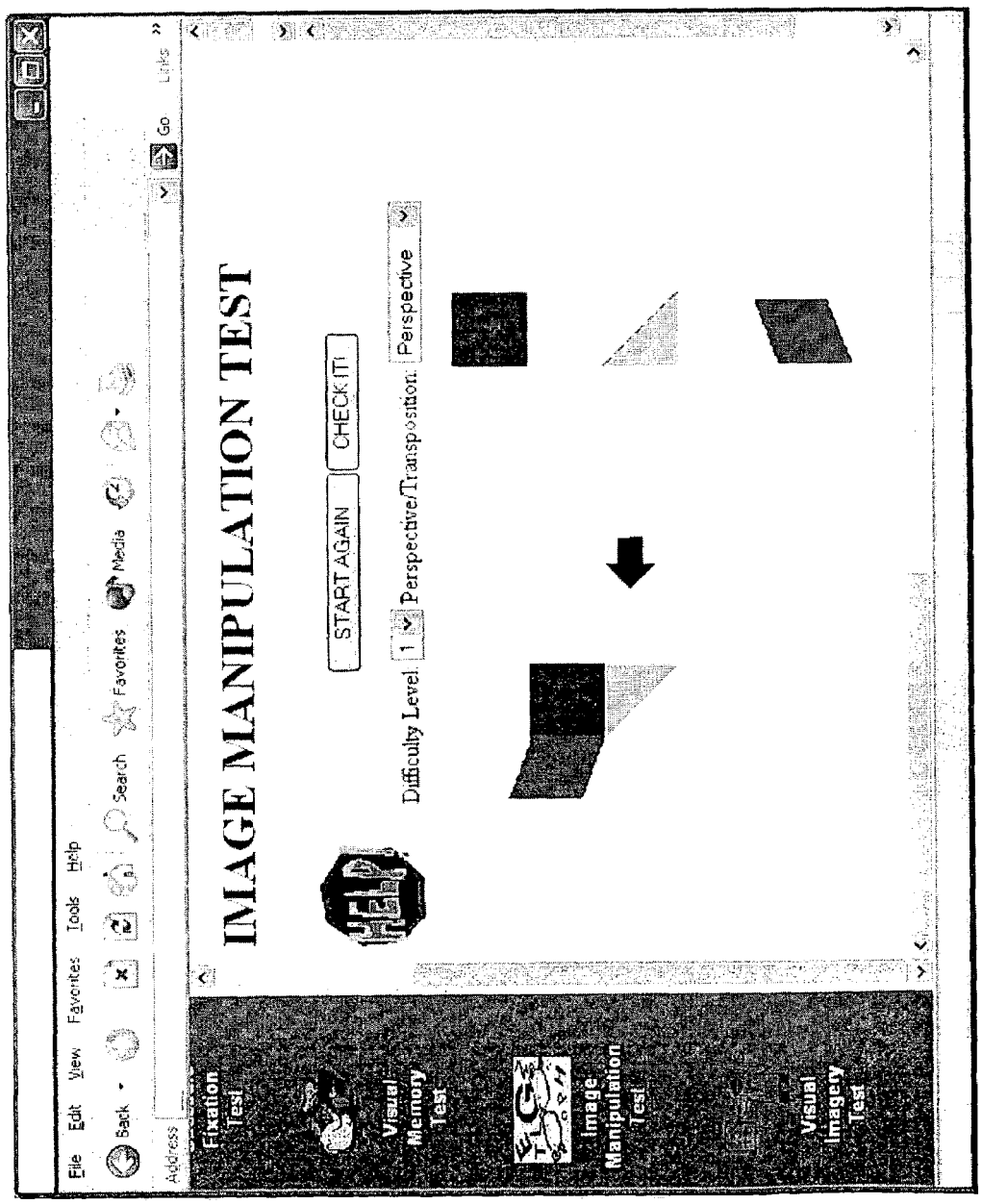
FIG. 27 is an exemplary illustration of a graphical user screen for the perspective test.

If the user selects to conduct the test, the user begins dragging and dropping the shapes on the right hand side of the display at step 161 to respond to the problem presented on the left hand side of the display (FIG. 27). Once the user has finished positioning the shapes, the user clicks on the CHECK IT button (FIG. 27) as determined at step 166 (FIG. 14). The answer is evaluated and a correct/incorrect indication is displayed at step 168. Once the user closes the correct/incorrect indication as determined at steps 170, 172 (FIG. 15), the test difficulty may be adjusted upward at step 174 if the user is having considerable success at the current level. At this point, the user enters information at step 175 to either restart the test, view help information for the test, view an example of the test, navigate to the previous test or proceed to the next test via corresponding steps 176, 177, 178, 179, 180. If the user feels the test has been performed to the best of their ability and that the test performance cannot improve, the user will choose to proceed to the next test at step 180.

Figure 16:
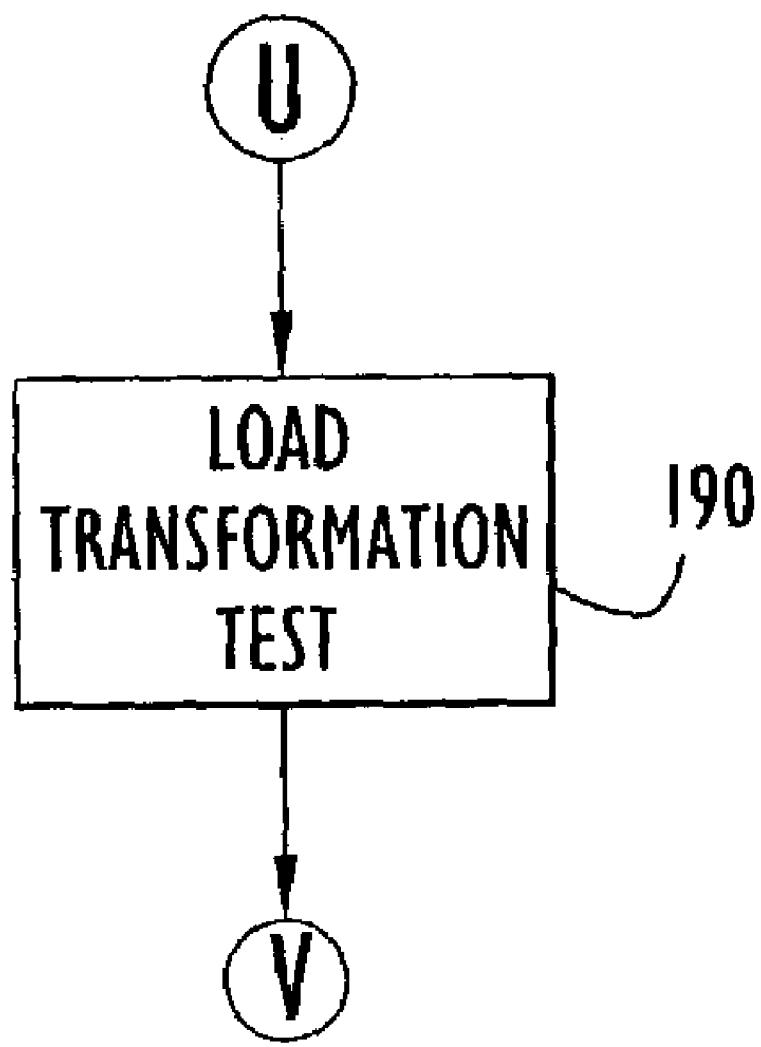
Figure 17:
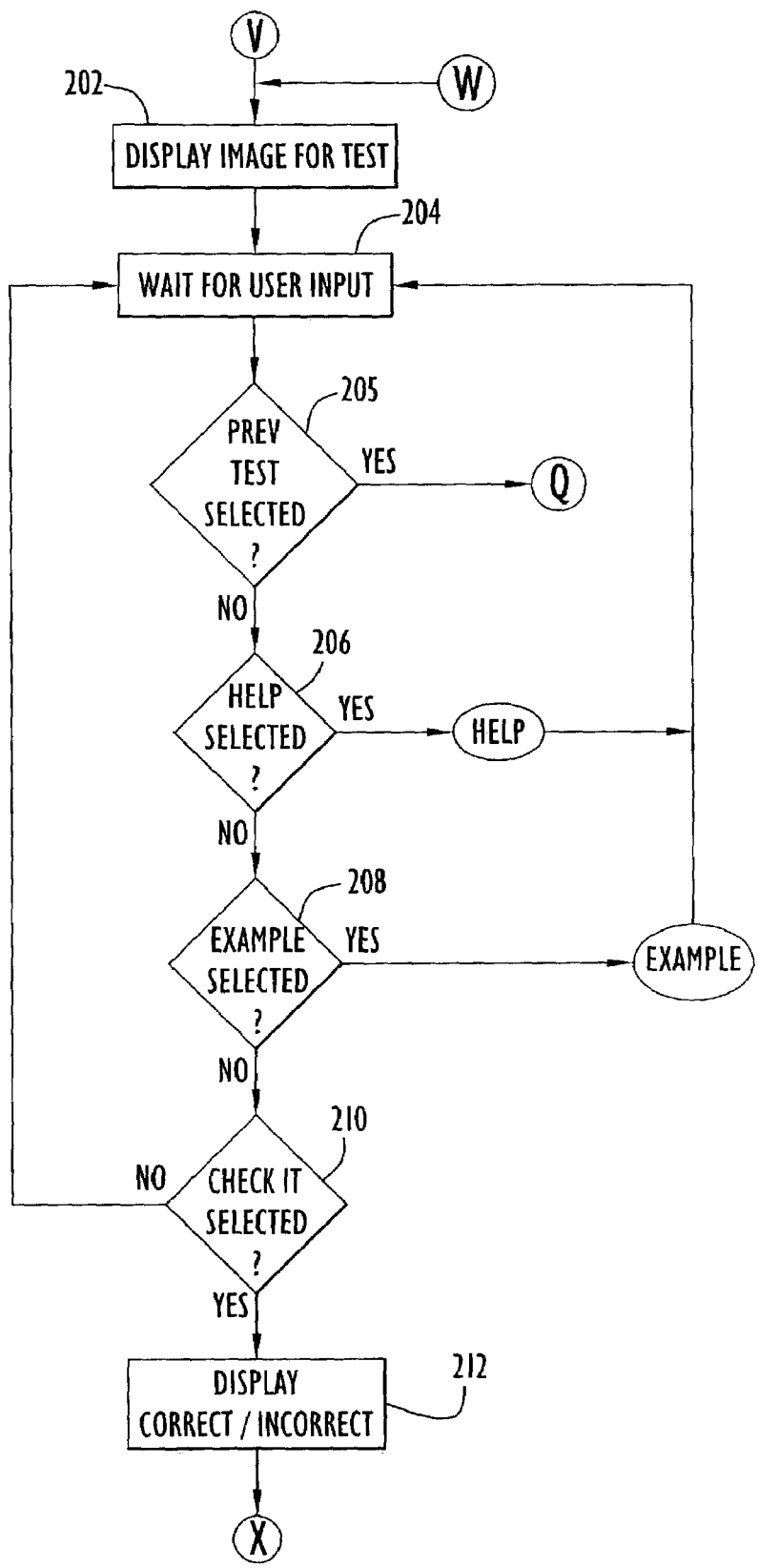
Figure 18:
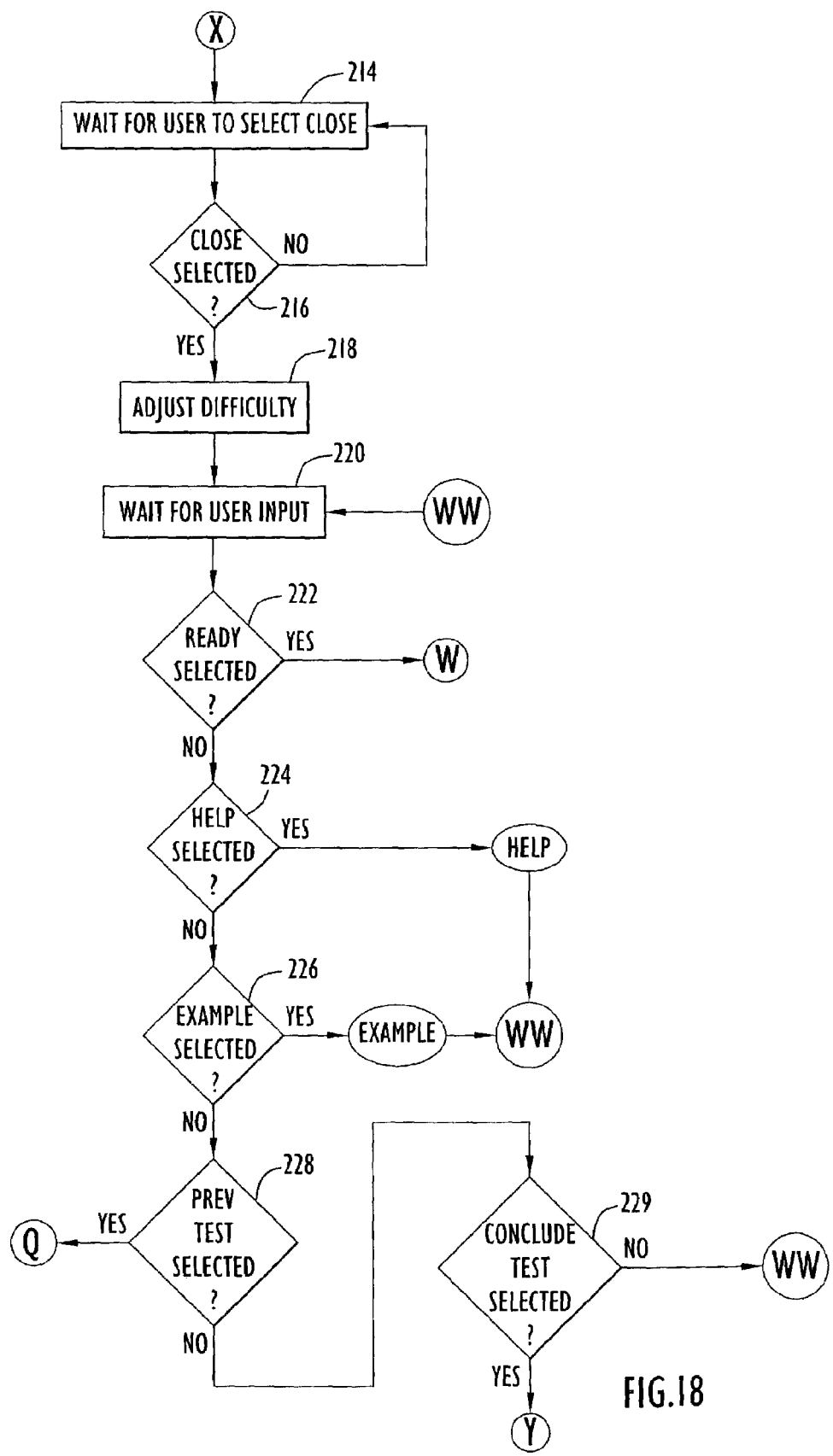
Figure 19:
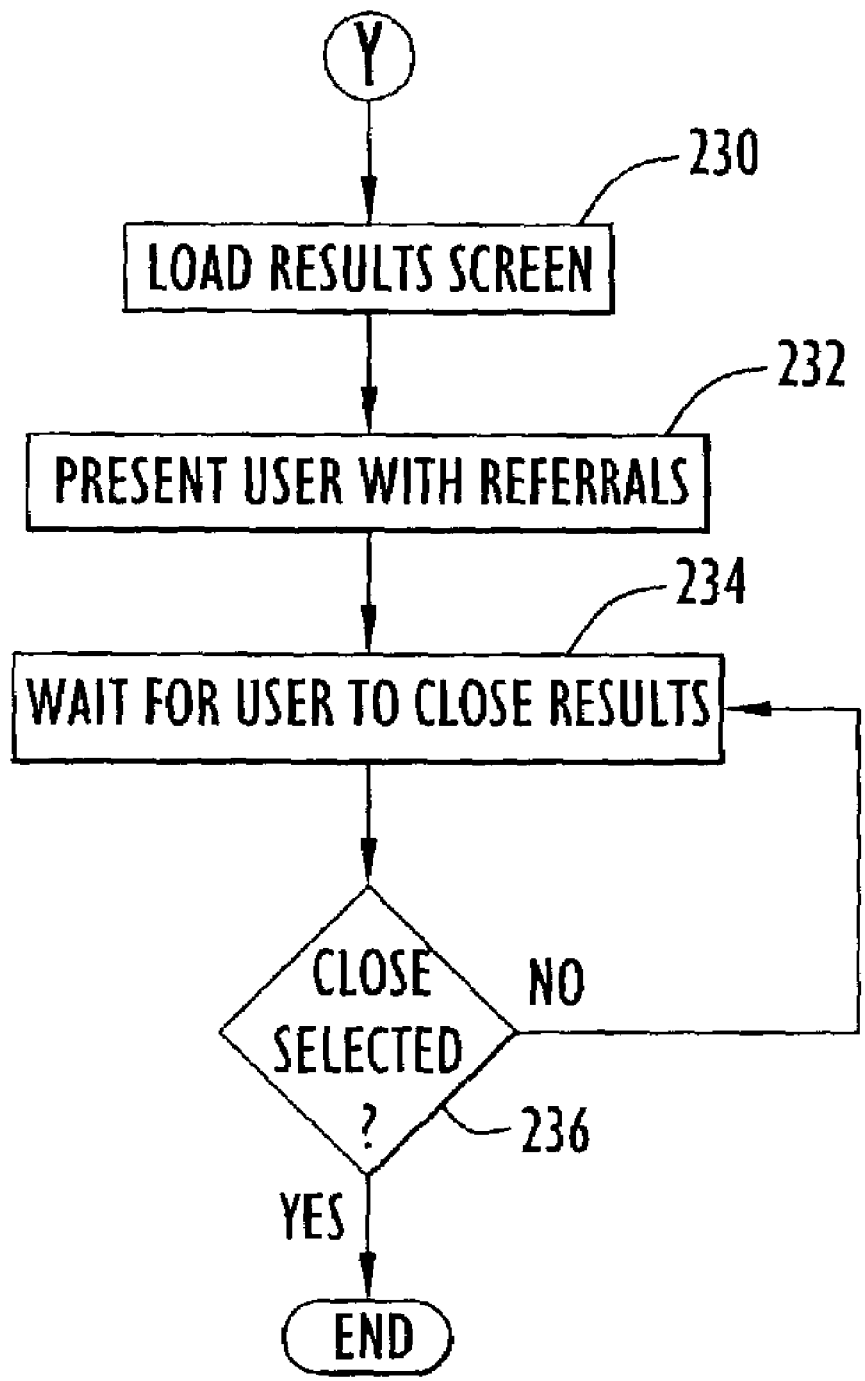

Referring to FIGS. 16-18, once the user proceeds to the next test, the transposition or transformation test is loaded into the user system at step 190 (FIG. 16). Transposition is the act of mentally manipulating a pictorial image into an image transformed by "flipping" or "rotating" that image. Patterns may be flipped around any body axis or rotated any number of degrees. An individual who can mentally transpose visually presented symbols can recognize the difference between letters that have similar characteristics and will therefore be less likely to retain reversals during printing. This ability is also helpful in comprehension of abstract concepts during reading and in developing knowledge of mathematical concepts. In the visual thinking-manipulation/transposition test, patterns composed of blocks (e.g., squares, triangles, and diamonds) are presented (FIG. 28) and the individual is asked to visualize how a given pattern would appear if the pattern were flipped toward the individual, flipped to the left, flipped to the right, or rotated ninety degrees to the left, ninety degrees to the right, or one-hundred eighty degrees in either direction. The individual then moves a second set of blocks (e.g., with the first presentation still available for viewing) via the keyboard or mouse into the transposed pattern requested. When complete, the individual is notified whether or not the pattern construction is "correct or incorrect". Results are reported against norms for a corresponding user age or grade level as described below. Upon loading at step 190, the user is presented at step 202 (FIG. 17) with the display image (FIG. 28) for the test with an arrow indicating which way to flip the shapes presented on the left side of the screen to achieve success. At this point, the user enters information at step 204 to either navigate to the previous test as determined at step 205, view help information for the test as determined at step 206, view an example of the test as determined at step 208 or conduct the test as determined at step 210. These functions are preferably invoked by appropriate buttons displayed on the screen.

If help is selected as determined at step 206, a help screen is presented with context sensitive textual information as described above for FIG. 20. If the user selects close (e.g., clicks on a close button) as determined at steps 1022, 1024 (FIG. 20), the help window is cleared at steps 1026, 1028 and the user returns to step 204 to either navigate to the previous test, view help information for the test, view an example of the test or conduct the test as described above.

If the user selects an example as determined at step 208, an example screen is presented to the user with text or a context sensitive animation reflecting the operation of the test as described above for FIG. 21. If the user selects close (e.g., clicks on a close button) as determined at steps 1122, 1124 (FIG. 21), the example window is cleared at steps 1126, 1128 and the user returns to step 204 to either navigate to the previous test, view help information for the test, view an example of the test or conduct the test as described above.

Figure 28:
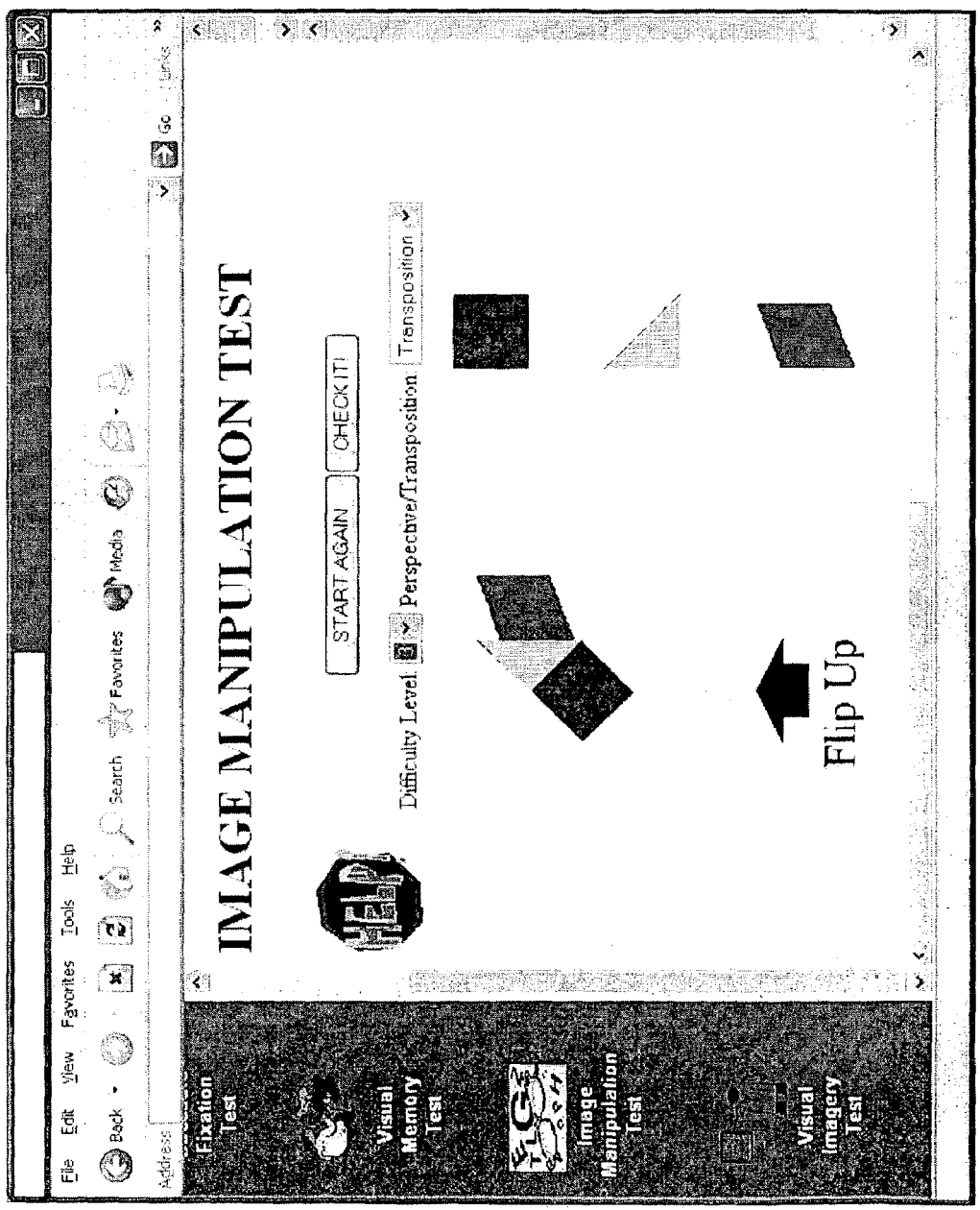
FIG. 28 is an exemplary illustration of a graphical user screen for the transposition or transformation test.

If the user selects to start the test, the user begins dragging and dropping the shapes on the right hand side of the display at step 204 to respond to the problem presented on the left hand side of the display (FIG. 28). Once the user has finished positioning the shapes, the user clicks on the CHECK IT button (FIG. 28) as determined at step 210 (FIG. 17). The answer is evaluated and a correct/incorrect indication is displayed at step 212. Once the user closes the correct/incorrect indication as determined at steps 214, 216 (FIG. 18), the test difficulty may be adjusted upward at step 218 if the user is having considerable success at the current level. At this point, the user enters information at step 220 to either restart the test, view help information for the test, view an example of the test, navigate to the previous test or complete the screening via corresponding steps 222, 224, 226, 228, 229. If the user feels the test has been performed to the best of their ability and that the test performance cannot improve, the user will choose to conclude the screening at step 229.

Once the user concludes the screening, the results are tabulated as described below and presented to the user at step 230 (FIG. 19) via a results screen (FIGS. 29A-29D). The user may print the results for future reference. If the user's test results do warrant further professional attention, the user is presented with referral options according to their previously provided biographical information at step 232. When the user closes the results screen as determined at steps 234, 236, the screening is complete.

The overall screening is basically partitioned into four screening areas where results can be reported. These areas include ocular movement (e.g., the Saccadic Fixation Test), visual imagery (e.g., the Visual Imagery Test), visual memory (e.g., the Visual Memory Test) and visual thinking (e.g., Perspective and Transposition tests). Each test area has historically well-established norms by age or by grade when the test presentation is standardized for instructional set and presentation method utilizing concrete materials (e.g., saccadic fixation charts of particular sizes, tachistoscopic presentation at set rates of speed, specific block patterns for recall, perspective, and transposition).

Results from a sample population including children, adolescents, young adults, and older adults were determined to adjust expected results where necessary. Each individual in the sample population had received testing and diagnostic interpretation in each of the test areas using traditional presentation methods, hence, their achievement level was known. The purpose of the study was to verify scoring criteria for traditional presentation versus presentation on computer screens.

Testing methodology is based on the concept that vision development cannot be accurately assessed with single presentations on a pass-fail basis. Presentations are therefore numerous. The scoring methodology for each area is described below.

With respect to the saccadic fixation test, presentations include ten lines of ten symbols, where each line is randomized to avoid memorization. Shapes are utilized for kindergarteners and first graders, numbers for first and second graders, and letters for first graders and grades beyond first grade. Individuals may practice as much as desired. Scoring is accomplished by averaging the test times for at least three valid iterations of the test (e.g., iterations taking longer than five seconds). The iterations are scored for time and accuracy and for the presence or absence of head movement. Accuracy and head movement assessment require the input (e.g., by keyboard stroke) from the individual tested or the accompanying adult as described above. The times of the three valid iterations are averaged and the resulting average time or final score is compared to the norm for a corresponding user age. Exemplary norms for corresponding user ages are indicated in Table I below.

TABLE I

| Age | Minimum Acceptable Time | Maximum Acceptable Time |
| --- | --- | --- |
| 3 | 18 seconds | 20 seconds |
| 4 | 18 seconds | 20 seconds |
| 5 | 18 seconds | 20 seconds |
| 6 | 18 seconds | 20 seconds |
| 7 | 17 seconds | 19 seconds |
| 8 | 16 seconds | 18 seconds |
| 9 | 15 seconds | 17 seconds |
| 10 | 14 seconds | 16 seconds |
| 11 | 13 seconds | 15 seconds |
| 12 | 12 seconds | 14 seconds |
| 13 | 11 seconds | 13 seconds |
| 14 | 10 seconds | 12 seconds |
| 15 | 9 seconds | 11 seconds |
| 16+ | 9 seconds | 11 seconds |

If the average time is less than the Minimum Acceptable Time for a given age, then the screening for this area is scored as passing. If the average time is greater than or equal to the Minimum Acceptable Time and less than the Maximum Acceptable Time for a given age, then the screening for this area is scored as marginally passing and the individual is recommended to rescreen in this area. If the average time is greater than the Maximum Acceptable Time for a given age, then the screening for this area is scored as failing.

The visual imagery test presents numerals (e.g., three to eight numerals per presentation) to an individual at increasing speeds of presentation (e.g., from approximately three seconds to approximately $1/100^{th}$ of a second). All presentations that are slower than $1/10^{th}$ of a second are practice presentations. All presentations at $1/10^{th}$ of a second and faster are scored for accuracy. Scoring is accomplished by comparing the difficulty level (e.g., quantity of numerals) at which the individual taking the test answered correctly for at least three valid iterations of the test (e.g., iterations for which the flashing numbers were displayed for less than $1/10^{th}$ second). The highest number of numerals that are $1/10^{th}$ of a second or faster and correctly reproduced becomes the final score and is compared to the norm for a corresponding user age. Exemplary norms for corresponding user ages are indicated in Table II below.

TABLE II

| Age | Minimum Acceptable Level |
| --- | --- |
| 3 | 1 |
| 4 | 1 |
| 5 | 2 |
| 6 | 2 |

TABLE II-continued

| Age | Minimum Acceptable Level |
|-----|--------------------------|
| 7   | 3 |
| 8   | 3 |
| 9   | 3 |
| 10  | 3 |
| 11  | 3 |
| 12  | 3 |
| 13  | 4 |
| 14  | 5 |
| 15  | 6 |
| 16+ | 6 |

If the level or final score is less than the Minimum Acceptable Level for a given age, then the screening for this area is scored as failing. Thus, failure is defined as the inability to obtain accurate reproductions by keyboard strokes or other input devices at speeds of presentation at or above $1/10^{th}$ of a second or by the inability to obtain accurate reproductions for at least the expected number of numerals by age.

If the level or final score is equal to the Minimum Acceptable Level, but the number of tests where this result was achieved was less than three, then the screening for this area is scored as marginally passing and the individual is recommended to rescreen in this area. If the level or final score is equal to or greater than the Minimum Acceptable Level for a given age and the number of tests where this result was achieved was three or more, then the screening for this area is scored as passing.

With respect to the visual thinking-recall test, presentations of patterns of blocks (e.g., squares) with an increasing number of colors and increasing pattern complexity are viewed, then removed from the screen and replaced by a question that must be answered by keyboard stroke or other input device. The individual is requested to reproduce the original pattern viewed by moving (e.g., via the keyboard) randomly placed blocks. Scoring is accomplished by ascertaining the difficulty level at which the individual taking the test answered correctly for at least three iterations of each test. This level serves as a final score and is compared to norms for age. Exemplary norms for corresponding user ages are indicated in Table III below.

TABLE III

| Age | Minimum Acceptable Level |
|-----|--------------------------|
| 3   | 2 |
| 4   | 3 |
| 5   | 3 |
| 6   | 3 |
| 7   | 4 |
| 8   | 4 |
| 9   | 4 |
| 10  | 4 |
| 11  | 4 |
| 12  | 4 |
| 13  | 4 |
| 14  | 4 |
| 15  | 4 |
| 16+ | 4 |

If the level or final score is less than the Minimum Acceptable Level for a given age, then the screening for this area is scored as failing. If the level or final score is equal to the Minimum Acceptable Level, but the number of iterations where this result was achieved was less than three, then the screening for this area is scored as marginally passing and the individual is recommended to rescreen in this area. If the level or final score is equal to or greater than the Minimum Acceptable Level for a given age and the number of iterations where this result was achieved was three or more, then the screening for this area is scored as passing.

The perspective test presents patterns of blocks (e.g., composed of squares, triangles, and diamonds) and the individual is asked to visualize how a given pattern would look from a different position (e.g., as noted by an arrow). The individual then moves a second series of blocks (e.g., with the first presentation of blocks still available for viewing) via the keyboard or mouse into the pattern that would be seen from the requested perspective. As success is obtained, pattern difficulty is increased by adding complexity. The transposition or transformation test presents patterns composed of blocks (e.g., squares, triangles, and diamonds) and the individual is asked to visualize how a given pattern would appear if it were flipped toward the individual, flipped to the left, flipped to the right, or rotated ninety degrees to the left, ninety degrees to the right, or one-hundred eighty degrees in either direction. The individual then moves a second set of blocks (e.g., with the first presentation still available for viewing) via the keyboard or mouse into the transposed pattern requested. As success is obtained, the complexity of patterns is increased.

Scoring on these tests is accomplished by ascertaining the difficulty level for each test at which the individual taking that test answered the test correctly for at least three iterations. This serves as a final score for that test. For each of these tests, the difficulty level is compared to norms for age. Exemplary norms for corresponding user ages are indicated in Table IV below.

TABLE IV

| Age | Minimum Acceptable Level |
|-----|--------------------------|
| 3   | 2 |
| 4   | 3 |
| 5   | 3 |
| 6   | 3 |
| 7   | 4 |
| 8   | 4 |
| 9   | 5 |
| 10  | 5 |
| 11  | 5 |
| 12  | 5 |
| 13  | 5 |
| 14  | 5 |
| 15  | 5 |
| 16+ | 5 |

If the level or final score is less than the Minimum Acceptable Level for a given age in either one of the tests, then the screening for that test and this area is scored as failing. If the level or final score is equal to the Minimum Acceptable Level, but the number of iterations where this result was achieved was less than three for either test, then the screening for that test and this area is scored as marginally passing and the individual is recommended to rescreen in this area. If the level or final score is equal to or greater than the Minimum Acceptable Level for a given age and the number of iterations where this result was achieved was three or more for either test, then the screening for that test is scored as passing. If this was achieved for both tests, then this area is similarly scored as passing.

Each area tested receives a pass or fail designation as described above. Age and grade expecteds are based upon the age and grade of the individual being tested. Pass designates achievement of the task criterion equal to or higher than age or grade expected. Fail designates inability to achieve or achievement of the task criterion below the age or grade expected.

A cumulative pass/fail designation is acquired by a weighted formula in which greater weight is given to higher levels of achievement in visual thinking. It is therefore possible that one or more areas are designated as failed, but the cumulative score designates pass, and vice versa. Referrals are recommended when a cumulative fail designation is obtained. Referrals are suggested for consideration when a fail designation is obtained for any single test area. Referrals are to certified vision development specialists presented based on geographic location of the individual tested. For example, if two or more areas are considered inadequate and there are signs and symptoms of learning difficulty that could be related to inadequate vision development, then the recommendation to seek further evaluation and possible therapeutic intervention would be a very strong one. If only a single area is considered inadequate, the recommendation for complete evaluation is still valid, for eliminating any gap in one's development is certainly a valuable goal. The tool may determine a recommendation and/or provide results and instructions to enable an individual to determine a course of action (FIGS. 29A-29D).

Each area probed can affect multiple aspects of academic achievement. If each probed area is considered adequate, but there are still symptoms of learning difficulties, it is possible that one has the capacity for learning through vision but has chosen a different learning method. It is possible to score adequately well in each separate area, and still have difficulty. Some individuals have developed mental imagery to a high level and have learned to use it in normal vision but not for academic study. These individuals could still benefit from a complete evaluation of their vision system and a determination of how they learn. If each area probed is considered adequate and there are no signs or symptoms of learning difficulty linked to vision, then one can feel much more comfortable eliminating vision related problems as a source of learning difficulty and begin looking for help within other biological systems which are considered important to learning. These areas include auditory processing disorders, language disorders, chemical disorders and emotional disorders.

Server system 4 (FIG. 1) may further include a vision therapy tool to conduct on-line vision therapy. The vision therapy tool may be included within the screening tool or be independent thereof and may be invoked from the server system by an end user system 8 via network 6. The vision therapy tool applies tested vision therapy principles using the Internet or other network and associated networking technology. The vision therapy tool includes a series of therapy modules to conduct activities that are prescribed by certified professionals who tailor the configuration of the therapy modules and activities used in therapy on an individual basis. The modules are configurable such that the modules can represent a raise in developmental level by one level or from the kindergarten level up to the adult level. The modules are also configurable to include the developmental areas of interest. The activities are scored by how well an individual does compared to the level of the individual at the start of the activity.

The therapy sessions are monitored by a therapy monitor (e.g., an administrator or practitioner) that uses key data saved from each individual's therapy session to evaluate an individual's performance and progress. As an individual or patient completes a therapy module or activity, the therapy monitor is responsible for recommending a course of action including: repeating the same module or activity, proceed to a more advanced module or activity, repeat a screening, conduct an in-office evaluation and/or discontinue activities for that area. The therapy modules or activities address the functional areas of saccadic eye movements, visual imagery, visual memory and visual thinking as described below.

As described above, saccadic movements are the very rapid and somewhat jerky eye movements that are utilized over and over again during the act of reading. The movements are basically from word to word and from the end of one line to the beginning of the next line. The eyes stop after each saccadic movement and fixate on the area of print upon which the movement has landed. In the saccadic eye movement therapy module or activity, the individual performs various eye movement tasks repetitively that are designed to improve the saccadic eye movement speed, range and accuracy of the individual performing the therapy. At the conclusion of each technique, results are shown to the individual to provide feedback so that the individual knows if improvement has occurred. In addition, while the therapy is being performed, key performance data about the individual performing the therapy is monitored to help determine the effectiveness of each therapeutic action. This performance data includes timing and accuracy of mouse clicks and keystrokes that are used to indicate how well the individual understands and can perform the therapy. The results are recorded and compared to previous results for the individual performing the therapy as well as to results that are established norms for age. The recorded results are automatically reviewed by the therapy module to provide automated progress reports to the therapy monitor.

Visual imagery is the immediate pictorial image that an individual constructs upon viewing something as described above. The construction of a mental pictorial image is at the discretion of the viewer (e.g., one may retain or discard a given image) once that individual has developed the capacity to produce such an image. In the visual imagery therapy module or activity, the individual performs various visual imagery tasks repetitively that are designed to improve the visual imagery ability of the individual performing the therapy. At the conclusion of each technique, results are shown to the individual to provide feedback so that the individual knows if improvement has occurred. In addition, while the therapy is being performed, key performance data about the individual performing the therapy is monitored to help determine the effectiveness of each therapeutic action. This performance data includes timing and accuracy of mouse clicks and keystrokes that are used to indicate how well the individual understands and can perform the therapy. The results are recorded and compared to previous results for the individual performing the therapy as well as to results that are established norms for age. The recorded results are automatically reviewed by the therapy module to provide automated progress reports to the therapy monitor.

As described above, visual memory is the ability to recall, over time, that which has been previously viewed. Visual memory is related to letter recognition, sight word vocabulary, spelling ability and math facts, such as times tables, formulas, lists (e.g., dates of events, shopping lists, etc.) and directions (e.g., map reading). In the visual memory therapy module or activity, the individual performs various visual memory tasks repetitively that are designed to improve the visual memory ability of the individual performing the therapy. At the conclusion of each technique, results are shown to the individual to provide feedback so that the individual knows if improvement has occurred. In addition, while the therapy is being performed, key performance data about the individual performing the therapy is monitored to help determine the effectiveness of each therapeutic action. The performance data includes timing and accuracy of mouse clicks and keystrokes that are used to indicate how well the individual understands and can perform the therapy. The results are recorded and compared to previous results for the individual performing the therapy as well as to results that are established norms for age. The recorded results are automatically reviewed by the therapy module to provide automated progress reports to the therapy monitor.

Visual thinking can be partitioned into two developmental areas (e.g., spatial perspective and translational perspective) as described above. Spatial perspective is a part of visual thinking that develops as an individual takes note of a view that is different from one's current view. If one can mentally construct a view from a perspective that is different from one's current perspective, then the individual is able to visualize from multiple viewpoints. This ability is helpful in the comprehension of printed material (e.g., viewing meaning from the author's perspective), the conceptualization of mathematical concepts (e.g., perspectives of number, size, shape) and studying and taking tests (e.g., knowledge of what is critically important to the teacher or test constructor). Translational perspective is the aspect of visual thinking during which one mentally manipulates a pictorial image into an image transformed by flipping that image around any axis. An individual who can mentally transpose visually presented symbols can recognize the difference between letters that have similar characteristics (e.g., "b" and "d") and will therefore be less likely to retain reversals during printing and reading. This ability is also helpful in the comprehension of abstract concepts during reading or during listening, following written or verbal instructions and in learning mathematical concepts. In the visual thinking therapy module or activity, the individual performs various visual thinking tasks repetitively that are designed to improve the visual thinking ability of the individual performing the therapy. At the conclusion of each technique, results are shown to the individual to provide feedback so that the individual knows if improvement has occurred. In addition, while the therapy is being performed, key performance data about the individual performing the therapy is monitored to help determine the effectiveness of each therapeutic action. The performance data includes timing and accuracy of mouse clicks and keystrokes that are used to indicate how well the individual understands and can perform the therapy. The results are recorded and compared to previous results for the individual performing the therapy as well as to results that are established norms for age. The recorded results are automatically reviewed by the therapy module to provide automated progress reports to the therapy monitor.

The vision therapy tool may employ various graphical user screens to conduct therapy activities and receive and display information in a manner similar to that described above for the screening tool. The screens may be navigated in any manner, may be arranged in any fashion and may include any desired information (e.g., help, example, tool or user information, etc.) and/or input mechanisms (e.g., links, buttons, etc.).

It will be appreciated that the embodiments described above and illustrated in the drawings represent only a few of the many ways of implementing a method and apparatus for screening aspects of vision development and visual processing related to cognitive development and learning on the Internet.

The end user and server computer systems may be implemented by any personal or other type of computer system (e.g., IBM-compatible, Apple, Macintosh, laptop, palm pilot, etc.). The computer systems may include any commercially available operating system (e.g., Windows, OS/2, Unix, Linux, etc.). The computer systems may further include any commercially available or custom software (e.g., server software, browser software, screening tool software, vision therapy software, etc.), and any types of input devices (e.g., keyboard, mouse, voice recognition, etc.). It is to be understood that the software for the screening and therapy tools of the present invention may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems may alternatively be implemented by hardware or other processing circuitry. The various functions of the screening and therapy tools may each be distributed in any manner among any quantity (e.g., one or more) of hardware and/or software modules or units, computer or processing systems or circuitry, where the computer or processing systems may be disposed locally or remotely of each other and communicate via any suitable communications medium (e.g., LAN, WAN, Intranet, Internet, hardwire, modem connection, wireless, etc.). The therapy tool may be included within the screening tool or be a separate stand-alone tool. The software, algorithms, tests and/or activities described above and/or illustrated in the flow charts may be modified in any manner that accomplishes the functions described herein.

The network may be implemented by any communications network (e.g., LAN, WAN, Internet, Intranet, etc.), while the server and end user computer systems may include any conventional or other communications devices to communicate over the network. The screening and therapy tools of the present invention may each be implemented by any quantity of computer systems, and may each reside and/or be executed on the server, end-user or other third-party computer system or any combination of these computer systems. The screening and therapy tools may each be available on recorded medium (e.g., floppy diskettes, CD-ROM, memory devices, etc.) for use on stand-alone systems or systems connected by a network, or may each be downloaded (e.g., in the form of carrier waves, packets, etc.) to systems from a network.

The saccadic fixation test may present any quantity of lines, each including any quantity of any type of symbols or characters (e.g., shapes, letters, numbers, punctuations, icons, etc.). The test may present any type of symbols or characters to users of any age or level. The test may require a user to recite any quantity of characters at any position from any desired lines, or may require the user to "follow" a moving or reappearing symbol or icon around a display screen by using the mouse or other input device to click on or locate the moving or reappearing symbol or icon. Scoring may utilize any desired quantity of valid tests, where a test may be considered valid based on an any desired criteria (e.g., test completion within any desired time interval, etc.). The times or mouse click or other input device location accuracies for valid tests may be combined in any fashion to determine a final score (e.g., added, averaged, weighted, etc.). The score may be determined from the test results (e.g., time, difficulty level, quantity of test iterations, etc.) in any fashion and include any desired value (e.g., number or numeric range, letter, symbol, etc.).

The visual imagery test may present any quantity of numbers or other characters or symbols at any desired presentation speed (e.g., for any desired time interval). The test may be adjusted in any fashion to adjust complexity (e.g., the quantity of characters presented and/or the time interval of presentation may be altered in any fashion). The test may present any type of symbols or characters to users of any age or level. Scoring may utilize any desired quantity of valid tests, where a test may be considered valid based on an any desired criteria (e.g., test completion with any desired presentation time interval, etc.). The score may be determined from the test results (e.g., time, difficulty level, quantity of test iterations, etc.) in any fashion and include any desired value (e.g., number or numeric range, letter, symbol, etc.).

The visual memory test may present any quantity of blocks or shapes (e.g., circle, square, rectangle, polygon, triangle, characters, symbols, numbers, etc.) of any color and arranged in any fashion. The test may present the arrangement for any desired time interval. The test may present any type of question to the user, or employ any other technique to remove the arrangement from view (e.g., flash the arrangement, remove the arrangement for a desired time interval, blank the screen for a time interval, etc.). The test may provide any quantity of any type of blocks (e.g., any shape, color, etc.) to produce the presented arrangement. The test complexity may be adjusted in any fashion (e.g., altering the presentation time and/or complexity of the arrangement in any fashion). Scoring may utilize any desired quantity of test iterations. The user levels may be assigned any desired values to indicate a particular level (e.g., numbers, letters, symbols etc.). The score may be determined from the test results (e.g., time, difficulty level, quantity of test iterations, etc.) in any fashion and include any desired value (e.g., number or numeric range, letter, symbol, etc.).

The perspective test may present any quantity of blocks or shapes (e.g., circle, square, rectangle, polygon, triangle, characters, symbols, numbers, etc.) of any color and arranged in any fashion. The test may request the user to reconstruct the arrangement at any desired perspective and provide the user with any quantity of any type of blocks (e.g., any shape, color, etc.) for the reconstruction. The desired perspective may be indicated in any fashion (e.g., arrow, etc.). The test complexity may be adjusted in any fashion (e.g., altering the complexity of the arrangement in any fashion). Scoring may utilize any desired quantity of test iterations. The user levels may be assigned any desired values to indicate a particular level (e.g., numbers, letters, symbols etc.). The score may be determined from the test results (e.g., time, difficulty level, quantity of test iterations, etc.) in any fashion and include any desired value (e.g., number or numeric range, letter, symbol, etc.).

The transposition test may present any quantity of blocks or shapes (e.g., circle, square, rectangle, polygon, triangle, characters, symbols, numbers, etc.) of any color and arranged in any fashion. The test may request the user to construct the arrangement rotated at any desired angle and provide the user with any quantity of any type of blocks (e.g., any shape, color, etc.) for the construction. The desired rotation may be indicated in any fashion (e.g., arrow, etc.). The test complexity may be adjusted in any fashion (e.g., altering the complexity of the arrangement in any fashion).

Scoring may utilize any desired quantity of test iterations. The user levels may be assigned any desired values to indicate a particular level (e.g., numbers, letters, symbols etc.). The score may be determined from the test results (e.g., time, difficulty level, quantity of test iterations, etc.) in any fashion and include any desired value (e.g., number or numeric range, letter, symbol, etc.).

The scoring may utilize any desired levels and any quantity of test iterations. The results of each test may be evaluated in any fashion to determine a pass/fail indication, while the results of the tests may be weighted and/or combined in any fashion (e.g., averaged, accumulated, any desired weighting, any combinations of individual pass/fail indications or scores, etc.) to determine an overall pass/fail indication or whether or not to provide referrals. The scores for individual tests may be of any values and compared to any norms or other data in any fashion to achieve a final score for a test. The screening tool may base recommendations or referrals on any desired score or scores combined in any fashion. The screening tool may determine a recommendation or course of action or provide scoring results and instructions to enable a user or practitioner to determine a course of action.

The screens for the tools may be displayed and arranged in any fashion and include any desired information. The screens may request and/or receive any desired information from a user (e.g., bibliographic information, physical information, personal information, etc.). Each screen may include any quantity of links, buttons or other input symbols (e.g., to navigate tests, to restart a test, to initiate help or example screens, to close screens, etc.) including any desired labels (e.g., help, close, ready, check it, etc.). The tools may employ any quantity of screens or other input mechanisms (e.g., prompts, menus, windows, etc.), where these input devices may interact with users via any input devices (e.g., mouse, keyboard, voice recognition, touch screen, etc.). The screens may be presented or navigated in any order or fashion. The results screen may display results (e.g., scores for any quantity of tests and/or iterations, etc.) and/or provide recommendations or referrals in any desired fashion (e.g., tables, text, images, directories, links, etc.). The screening and therapy tools may provide reports in any desired format or arrangement. Further, the therapy tool may produce recommendations based on therapy data (e.g., automate functions of the therapy administrator or monitor).

The screening and therapy tools may be associated with or executed from the same or different web sites, and may reside on the same or different server system or plural server systems. Further, the screening and therapy tools may each include any quantity of any suitable tests or activities (e.g., for vision, learning, therapy, etc.) conducted in any desired order or arrangement to screen and provide therapy to users. The tests and therapy may be administered in any fashion (e.g., based on attempts, timed, etc.) and with any quantity of symbols (e.g., numbers, letters, shapes, etc.) and/or iterations.

In addition, the server and/or end user systems may include login, security or other access control software and/or devices to control access to the screening and/or therapy tools and/or enable storage and retrieval of information relating to prior screenings and/or sessions for particular users (e.g., for establishing user accounts, subscriptions and/or secure sessions, for saving and retrieving information relating to prior partial screenings or therapies (e.g., to complete the screening or therapy in plural sessions, to screen for particular deficiencies, etc.) or full screenings or therapies, etc.). Further, the server and/or end user systems may include transactional software and/or devices in order to enable the systems to receive payment (e.g., via credit or other transactional cards, funds transfer, etc.) for the screening and/or therapy.

It is to be understood that the terms "right", "left", "upward", "downward" and the like are used herein merely to describe points of reference and do not limit the present invention to any particular configuration or orientation.

From the foregoing description, it will be appreciated that the invention makes available a novel method and apparatus for screening aspects of vision development and visual processing related to cognitive development and learning on the Internet, wherein vision screening and/or therapy may be conducted remotely to ascertain and/or enhance vision capabilities related to learning development.

Having described preferred embodiments of a new and improved method and apparatus for screening aspects of vision development and visual processing related to cognitive development and learning on the Internet, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A system for screening aspects of vision associated with learning in individuals comprising:
   a processing system to evaluate aspects of user vision associated with learning, said processing system including:
      a screening module to determine vision related causes of learning difficulties of a user by presenting a plurality of tests to said user on a display and to conduct and process said tests, wherein each test screens a corresponding aspect of user vision associated with learning, and wherein said screening module includes:
         an eye movement module to present an eye movement test to said user on said display and to conduct and process said eye movement test to screen user eye movement during reading;
         a visual image module to present a visual image test to said user on said display and to conduct and process said visual image test to screen a user ability to construct a mental pictorial image by viewing;
         a visual memory module to present a visual memory test to said user on said display and to conduct and process said visual memory test to screen a user ability to visually recall mental pictorial images;
         a perspective module to present a perspective test to said user on said display and to conduct and process said perspective test to screen a user ability to visually manipulate mental pictorial images viewed from various perspectives; and
         a transposition module to present a transposition test to said user on said display and to conduct and process said transposition test to screen a user ability to mentally translate or rotate pictorial images; and
      an evaluation module to evaluate user performance of said tests relative to corresponding norms for those tests associated with user ages to determine a status of said aspects of user vision as a cause of said learning difficulties, wherein said evaluation module includes:
         a status module to determine results of each said test based on said user performance, wherein said user performance of each said test is compared to a corresponding norm for that test associated with the age of said user to determine said status of said corresponding vision aspect associated with each test; and
         a designation module to produce an overall designation for said screening relating to an overall status of user vision aspects by weighting said results of each said test and combining said weighted results, wherein said overall designation for said screening includes one of pass and fail and said results of said perspective and transposition tests are given greater weight relative to remaining ones of said tests to produce said overall designation.

2. The system of claim 1, wherein said processing system is accessible over a network by at least one end-user processing system to conduct said screening of said aspects of user vision remotely.

3. The system of claim 2, wherein said network includes the Internet.

4. The system of claim 1, wherein said eye movement module includes:
   a presentation module to present a plurality of lines, each containing a series of characters, to said user on said display to enable said user to recite initial and terminal portions of each line; and
   a results module to determine an amount of time for said user to perform said recitations to determine results for said eye movement test.

5. The system of claim 1, wherein said visual image module includes:
   a presentation module to present a series of characters for a predetermined time interval to said user on said display and facilitate entry of said presented characters by said user after expiration of said time interval; and
   a results module to compare said entered characters to said presented characters to determine results for said visual image test.

6. The system of claim 1, wherein said visual memory module includes:
   a presentation module to present a series of objects in a particular arrangement to said user on said display for a predetermined time interval and to facilitate manipulation of a second series of presented objects by said user into said presented arrangement after expiration of said time interval; and
   a results module to compare said entered arrangement to said presented arrangement to determine results for said visual memory test.

7. The system of claim 1, wherein said perspective module includes:
   a presentation module to present a series of objects in a predetermined arrangement and an alteration indicator indicating a particular viewing perspective to said user on said display and to facilitate manipulation of a second series of presented objects by said user into said presented arrangement as viewed from said indicated perspective; and
   a results module to compare said entered arrangement to said presented arrangement in said indicated perspective to determine results for said perspective test.

8. The system of claim 1, wherein said transposition module includes:
- a presentation module to present a series of objects in a predetermined arrangement and an alteration indicator indicating a particular orientation to said user on said display and to facilitate manipulation of a second series of presented objects by said user into said presented arrangement oriented in said indicated orientation; and
- a results module to compare said entered arrangement to said presented arrangement in said indicated orientation to determine results for said transposition test.

9. The system of claim 1, wherein said evaluation module further includes:
- a recommendation module to determine a recommended course of action for said user based on said status of each vision aspect associated with a corresponding test.

10. The system of claim 1, wherein said evaluation module further includes:
- a referral module to refer said user to a practitioner in accordance with a deficiency in user vision aspects indicated by said status of each test or said overall designation.

11. The system of claim 1, wherein said processing system further includes:
- a therapy module to present at least one activity to said user on said display and to conduct and process said at least one activity, wherein each activity enhances a corresponding aspect of user vision associated with learning.

12. A computer-implemented method of determining vision related causes of learning difficulties of a user by screening aspects of vision associated with learning via a processing system comprising:
- (a) presenting a plurality of tests to said user on a display and conducting and processing said tests, wherein each test screens a corresponding aspect of user vision associated with learning, and wherein (a) further includes:
  - (a. 1) presenting an eve movement test to said user on said display and conducting and processing said eye movement test to screen user eye movement during reading;
  - (a.2) presenting a visual image test to said user on said display and conducting and processing said visual image test to screen a user ability to construct a mental pictorial image by viewing;
  - (a.3) presenting a visual memory test to said user on said display and conducting and processing said visual memory test to screen a user ability to visually recall mental pictorial images;
  - (a.4) presenting a perspective test to said user on said display and conducting and processing said perspective test to screen a user ability to visually manipulate mental pictorial images viewed from various perspectives; and
  - (a.5) presenting a transposition test to said user on said display and conducting and Processing said transposition test to screen a user ability to mentally translate or rotate pictorial images; and
- (b) evaluating user performance of said tests relative to corresponding norms for those tests associated with user ages to determine a status of said aspects of user vision as a cause of said learning difficulties, wherein step (b) further includes:
  - (b. 1) determining results of each said test based on said user performance, wherein said user performance of each said test is compared to a corresponding norm for that test associated with the age of said user to determine said status of said corresponding vision aspect associated with each test; and
  - (b.2 ) producing an overall designation for said screening relating to an overall status of user vision aspects by weighting said results of each said test and combining said weighted results, wherein said overall designation includes one of pass and fail and said results of said perspective and transposition tests are given greater weight relative to remainin2 ones of said tests to produce said overall designation.

13. The method of claim 12, wherein said processing system is accessible over a network by at least one end-user processing system, and step (a) further includes conducting said screening of said aspects of user vision remotely.

14. The method of claim 13, wherein said network includes the Internet.

15. The method of claim 12, wherein step (a. 1) further includes:
- (a. 1.1) presenting a plurality of lines, each containing a series of characters, to said user on said display to enable said user to recite initial and terminal portions of each line; and
- (a. 1.2) determining an amount of time for said user to perform said recitations to determine results for said eye movement test.

16. The method of claim 12, wherein step (a.2) further includes:
- (a.2.1) presenting a series of characters for a predetermined time interval to said user on said display and facilitating entry of said presented characters by said user after expiration of said time interval; and
- (a.2.2) comparing said entered characters to said presented characters to determine results for said visual image test.

17. The method of claim 12, wherein step (a.3) further includes:
- (a.3.1) presenting a series of objects in a particular arrangement to said user on said display for a predetermined time interval and facilitating manipulation of a second series of presented objects by said user into said presented arrangement after expiration of said time interval; and
- (a. 1.2) comparing said entered arrangement to said presented arrangement to determine a results for said visual memory test.

18. The method of claim 12, wherein step (a.4) further includes: (a.4.1) presenting a series of objects in a predetermined arrangement and an alteration indicator indicating a particular viewing perspective to said user on said display and facilitating manipulation of a second series of presented objects by said user into said presented arrangement as viewed from said indicated perspective; and
- (a.4.2) comparing said entered arrangement to said presented arrangement in said indicated perspective to determine a-see*e results for said perspective test.

19. The method of claim 12, wherein step (a.5) further includes:
- (a.5.1) presenting a series of objects in a predetermined arrangement and alteration indicator indicating a particular orientation to said user on said display and facilitating manipulation of a second series of presented objects by said user into said presented arrangement oriented in said indicated orientation; and
- (a.5.2) comparing said entered arrangement to said presented arrangement in said indicated orientation to determine results for said transposition test.

20. The method of claim 12, wherein step (b) further includes:
(b.3) determining a recommended course of action for said user based on said status of each vision aspect associated with a corresponding test.

21. The method of claim 12, wherein step (b) further includes:
(b.3) referring said user to a practitioner in accordance with a deficiency in user vision aspects indicated by said status of each test or said overall designation.

22. The method of claim 12, further including:
(c) presenting at least one activity to said user on said display and conducting and processing said at least one activity, wherein each activity enhances a corresponding aspect of user vision associated with learning.

23. A program product apparatus including a computer readable medium with computer program logic recorded thereon for determining vision related causes of learning difficulties of a user by screening aspects of vision associated with learning via a processing system, said program product apparatus comprising:
a screening module to present a plurality of tests to said user on a display and to conduct and process said tests wherein each test screens a corresponding aspect of user vision associated with learning, and wherein said screening module includes;
an eye movement module to present an eye movement test to said user on said display and to conduct and process said eye movement test to screen user eye movement during reading;
a visual image module to present a visual image test to said user on said display and to conduct and process said visual image test to screen a user ability to construct a mental pictorial image by viewing;
a visual memory module to present a visual memory test to said user on said display and to conduct and process said visual memory test to screen a user ability to visually recall mental pictorial images;
a perspective module to present a perspective test to said user on said display and to conduct and process said perspective test to screen a user ability to visually manipulate mental pictorial images viewed from various perspectives; and
a transposition module to present a transposition test to said user on said display and to conduct and process said transposition test to screen a user ability to mentally translate or rotate pictorial images; and
an evaluation module to evaluate user performance of said tests relative to corresponding norms for those tests associated with user ages to determine a status of said aspects of user vision as a cause of said learning difficulties, wherein said evaluation module includes:
a status module to determine results of each said test based on said user performance, wherein said user performance of each said test is compared to a corresponding norm for that test associated with the age of said user to determine said status of said corresponding vision aspect associated with each test; and
a designation module to produce an overall designation for said screening relating to an overall status of user vision aspects by weighting said results of each said test and combining said weighted results, wherein said overall designation includes one of pass and fail and said results of said perspective and transposition tests are given greater weight relative to remaining ones of said tests to produce said overall designation.

24. The apparatus of claim 23, wherein said processing system is accessible over a network by at least one end-user processing system to conduct said screening of said aspects of user vision remotely.

25. The apparatus of claim 24, wherein said network includes the Internet.

\* \* \* \* \*